(12) United States Patent
Hill et al.

(10) Patent No.: US 8,908,469 B2
(45) Date of Patent: Dec. 9, 2014

(54) ACQUIRING AZIMUTH RICH SEISMIC DATA IN THE MARINE ENVIRONMENT USING A REGULAR SPARSE PATTERN OF CONTINUOUSLY CURVED SAIL LINES

(71) Applicant: WesternGeco L.L.C., Houston, TX (US)

(72) Inventors: David Ian Hill, Sunbury On Thames (GB); Nicolae Moldoveanu, Houston, TX (US); Steven Fealy, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 13/943,560

(22) Filed: Jul. 16, 2013

(65) Prior Publication Data

US 2013/0301384 A1 Nov. 14, 2013

Related U.S. Application Data

(63) Continuation of application No. 12/351,156, filed on Jan. 9, 2009, now Pat. No. 8,488,409, which is a continuation-in-part of application No. 12/121,324, filed on May 15, 2008, now Pat. No. 8,559,265.

(60) Provisional application No. 61/105,535, filed on Oct. 15, 2008, provisional application No. 60/969,203, filed on Aug. 31, 2007, provisional application No. 60/966,534, filed on Aug. 9, 2007, provisional application No. 60/938,547, filed on May 17, 2007.

(51) Int. Cl.
  *G01V 1/38* (2006.01)
(52) U.S. Cl.
  CPC .................... *G01V 1/3808* (2013.01)
  USPC ................. 367/16; 367/15; 367/20
(58) Field of Classification Search
  CPC .................................................. G01V 1/3808
  USPC ............ 367/15, 16, 19, 20, 21, 56, 117, 130; 702/17
  See application file for complete search history.

(56) References Cited

U.S. PATENT DOCUMENTS

| | | | |
|---|---|---|---|
| 2,404,440 A | 7/1946 | Holm | |
| 2,465,696 A | 3/1949 | Pasley | |

(Continued)

FOREIGN PATENT DOCUMENTS

| | | | |
|---|---|---|---|
| EP | 0 018053 A1 | 10/1980 | |
| EP | 0 018053 B1 | 12/1983 | |

(Continued)

OTHER PUBLICATIONS

Cole et al., "A Circular Seismic Acquisition Technique for Marine Three-Dimensional Surveys," Offshore Technology Conference, OTC 4864, Houston, Texas, May 6-9, 1985, pp. 217-220.*

(Continued)

*Primary Examiner* — Isam Alsomiri
*Assistant Examiner* — Daniel L Murphy

(57) ABSTRACT

A method for determining a sail plan for a towed-array marine seismic survey includes: dividing a survey area into a regular grid of tiles; and identifying a subset of the tiles as nodes around which continuously curved sail lines are defined. The nodes define regular pattern further including: a first subpattern of nodes; and a second subpattern of nodes offset from the first subpattern. A method for conducting a towed array marine survey includes: traversing a plurality of continuously curved sail lines across a survey area, each sail line being relative to a node; and acquiring seismic data while traversing the continuously curved sail lines. The set of nodes defining a regular pattern further including: a first subpattern of nodes; and a second subpattern of nodes offset from the first subpattern.

17 Claims, 19 Drawing Sheets

(56) References Cited

U.S. PATENT DOCUMENTS

| | | | |
|---|---|---|---|
| 2,693,862 A | 11/1954 | Reiber | |
| 2,823,375 A | 2/1958 | Camp | |
| 3,283,293 A | 11/1966 | Pavey et al. | |
| 3,331,050 A | 7/1967 | Kilmer et al. | |
| 3,440,992 A | 4/1969 | Chance | |
| 3,505,577 A | 4/1970 | Hirokawa | |
| 3,506,674 A | 4/1970 | Berger | |
| 3,560,912 A | 2/1971 | Spink et al. | |
| 3,581,273 A | 5/1971 | Hedberg | |
| 3,605,674 A | 9/1971 | Weese | |
| 3,774,570 A | 11/1973 | Pearson | |
| 3,806,863 A | 4/1974 | Tilley et al. | |
| 3,896,756 A | 7/1975 | Pearson et al. | |
| 3,921,124 A | 11/1975 | Payton | |
| 3,934,220 A | 1/1976 | Davis | |
| 3,953,827 A | 4/1976 | Le Moal et al. | |
| 4,033,278 A | 7/1977 | Waters | |
| 4,068,208 A | 1/1978 | Rice, Jr. et al. | |
| 4,074,648 A | 2/1978 | Reid et al. | |
| 4,086,504 A | 4/1978 | Ezell et al. | |
| 4,146,870 A | 3/1979 | Ruehle | |
| 4,231,111 A | 10/1980 | Neeley | |
| 4,290,124 A | 9/1981 | Cole | |
| 4,383,259 A | 5/1983 | Rader | |
| 4,404,664 A | 9/1983 | Zachariadis | |
| 4,468,663 A | 8/1984 | Kalt | |
| 4,486,863 A * | 12/1984 | French | 367/15 |
| 4,648,080 A | 3/1987 | Hargreaves | |
| 4,669,097 A | 5/1987 | Bristol | |
| 4,709,355 A | 11/1987 | Woods et al. | |
| 4,729,333 A | 3/1988 | Kirby et al. | |
| 4,757,482 A | 7/1988 | Fiske, Jr. | |
| 4,803,668 A | 2/1989 | Berryhill et al. | |
| 4,834,181 A | 5/1989 | Uhri et al. | |
| 4,890,568 A | 1/1990 | Dolengowski | |
| 4,912,684 A | 3/1990 | Fowler | |
| 4,942,991 A | 7/1990 | Lyons | |
| 4,960,183 A | 10/1990 | Young, II | |
| 4,965,773 A | 10/1990 | Marschall | |
| 4,970,696 A * | 11/1990 | Crews et al. | 367/15 |
| 4,970,697 A | 11/1990 | Earley et al. | |
| 4,992,990 A | 2/1991 | Langeland et al. | |
| 4,992,991 A | 2/1991 | Young et al. | |
| 5,031,159 A | 7/1991 | Rouquette | |
| 5,179,905 A | 1/1993 | Hossfield et al. | |
| 5,200,930 A | 4/1993 | Rouquette | |
| 5,300,929 A | 4/1994 | MacLeod | |
| 5,329,071 A | 7/1994 | Vatne et al. | |
| 5,353,223 A | 10/1994 | Norton et al. | |
| 5,430,689 A | 7/1995 | Rigsby et al. | |
| 5,443,027 A | 8/1995 | Owsley et al. | |
| H1490 H | 9/1995 | Thompson et al. | |
| 5,508,973 A | 4/1996 | Mallick et al. | |
| 5,532,975 A | 7/1996 | Elholm | |
| 5,546,882 A | 8/1996 | Kuche | |
| 5,555,531 A | 9/1996 | Booth et al. | |
| 5,640,325 A | 6/1997 | Banbrook et al. | |
| 5,668,775 A | 9/1997 | Hatteland | |
| 5,677,893 A | 10/1997 | de Hoop et al. | |
| 5,761,152 A | 6/1998 | Jacobsen et al. | |
| 5,790,472 A | 8/1998 | Workman et al. | |
| 5,973,995 A | 10/1999 | Walker et al. | |
| 5,978,316 A | 11/1999 | Ambs et al. | |
| 6,011,752 A | 1/2000 | Ambs et al. | |
| 6,011,753 A | 1/2000 | Chien | |
| 6,044,040 A | 3/2000 | Holland | |
| 6,061,301 A | 5/2000 | Corrigan | |
| 6,144,342 A | 11/2000 | Bertheas et al. | |
| 6,175,809 B1 | 1/2001 | Naville | |
| 6,178,381 B1 | 1/2001 | Padhi et al. | |
| 6,285,956 B1 | 9/2001 | Bennett et al. | |
| 6,292,754 B1 | 9/2001 | Thomsen | |
| 6,343,256 B1 | 1/2002 | Winbow et al. | |
| 6,418,378 B1 | 7/2002 | Nyland | |
| 6,477,111 B1 | 11/2002 | Lunde et al. | |
| 6,525,992 B1 | 2/2003 | Olivier et al. | |
| 6,529,832 B1 | 3/2003 | Kerekes | |
| 6,553,315 B2 | 4/2003 | Kerekes et al. | |
| 6,590,831 B1 | 7/2003 | Bennett et al. | |
| 6,629,037 B1 | 9/2003 | Nyland | |
| 6,671,223 B2 | 12/2003 | Bittleston | |
| 6,684,160 B1 | 1/2004 | Ozbek et al. | |
| 6,691,038 B2 | 2/2004 | Zajac | |
| 6,714,873 B2 | 3/2004 | Bakulin et al. | |
| 6,837,175 B1 | 1/2005 | Gieseke | |
| 6,847,896 B1 | 1/2005 | Orban et al. | |
| 6,862,531 B2 | 3/2005 | Horne et al. | |
| 6,865,487 B2 | 3/2005 | Charron | |
| 6,932,017 B1 | 8/2005 | Hillesund et al. | |
| 6,944,094 B1 | 9/2005 | Thomsen et al. | |
| 7,065,449 B2 | 6/2006 | Brewster et al. | |
| 7,080,607 B2 | 7/2006 | Hillesund et al. | |
| 7,203,130 B1 | 4/2007 | Welker | |
| 7,239,577 B2 | 7/2007 | Tenghamn et al. | |
| 7,293,520 B2 | 11/2007 | Hillesund et al. | |
| 7,377,224 B2 | 5/2008 | Ryan et al. | |
| 7,391,673 B2 * | 6/2008 | Regone et al. | 367/16 |
| 7,400,552 B2 | 7/2008 | Moldoveanu et al. | |
| 7,403,448 B2 | 7/2008 | Welker et al. | |
| 7,616,522 B2 | 11/2009 | Rouquette | |
| 7,679,990 B2 | 3/2010 | Herkenhoff et al. | |
| 7,952,522 B2 | 5/2011 | Hohl | |
| 7,965,583 B2 | 6/2011 | Thomas | |
| 8,004,930 B2 | 8/2011 | Welker et al. | |
| 2002/0193947 A1 | 12/2002 | Chamberlain | |
| 2003/0067842 A1 | 4/2003 | Sukup et al. | |
| 2003/0125878 A1 | 7/2003 | Bakulin et al. | |
| 2004/0042341 A1 | 3/2004 | Tenghamn et al. | |
| 2004/0066707 A1 | 4/2004 | Tenghamn et al. | |
| 2004/0125697 A1 * | 7/2004 | Fleming | 367/19 |
| 2004/0240319 A1 * | 12/2004 | Carvill et al. | 367/21 |
| 2005/0018537 A1 | 1/2005 | Welker et al. | |
| 2005/0180260 A1 | 8/2005 | Planke et al. | |
| 2005/0180263 A1 | 8/2005 | Lambert et al. | |
| 2005/0194201 A1 | 9/2005 | Tenghamn et al. | |
| 2006/0215489 A1 | 9/2006 | Solheim et al. | |
| 2006/0227657 A1 | 10/2006 | Tveide et al. | |
| 2006/0239117 A1 | 10/2006 | Singh et al. | |
| 2006/0256653 A1 | 11/2006 | Toennessen et al. | |
| 2006/0256654 A1 | 11/2006 | Paulsen | |
| 2006/0285435 A1 | 12/2006 | Robertsson | |
| 2007/0064526 A1 | 3/2007 | Holo | |
| 2007/0104028 A1 | 5/2007 | Van Manen et al. | |
| 2007/0127312 A1 | 6/2007 | Storteig et al. | |
| 2007/0159921 A1 | 7/2007 | Regone et al. | |
| 2007/0165486 A1 | 7/2007 | Moldoveanu et al. | |
| 2007/0274153 A1 | 11/2007 | Bisley et al. | |
| 2008/0008037 A1 | 1/2008 | Welker | |
| 2008/0239875 A1 | 10/2008 | Alumbaugh et al. | |
| 2008/0267010 A1 | 10/2008 | Moldoveau et al. | |
| 2008/0285380 A1 | 11/2008 | Rouquette | |
| 2008/0285381 A1 | 11/2008 | Moldoveanu et al. | |
| 2009/0122640 A1 | 5/2009 | Hill et al. | |
| 2009/0245019 A1 | 10/2009 | Falkenberg et al. | |
| 2009/0262601 A1 | 10/2009 | Hillesund et al. | |
| 2009/0310439 A1 | 12/2009 | Hauan et al. | |
| 2009/0310440 A1 | 12/2009 | Solheim et al. | |
| 2009/0316525 A1 | 12/2009 | Welker | |
| 2010/0013485 A1 | 1/2010 | Alumbaugh et al. | |
| 2010/0027374 A1 | 2/2010 | Moldoveanu et al. | |
| 2010/0118645 A1 | 5/2010 | Welker et al. | |
| 2010/0142317 A1 | 6/2010 | Moldoveanu et al. | |
| 2010/0238762 A1 | 9/2010 | Hornbostel | |
| 2011/0158041 A1 | 6/2011 | Moldoveanu et al. | |
| 2011/0158042 A1 | 6/2011 | Moldoveanu et al. | |

FOREIGN PATENT DOCUMENTS

| | | |
|---|---|---|
| EP | 0 321705 A2 | 6/1989 |
| EP | 0 347019 A2 | 12/1989 |
| EP | 0 562781 A2 | 9/1993 |
| EP | 0 613025 A1 | 8/1994 |
| EP | 0 613025 B1 | 9/1998 |
| EP | 0 681193 B1 | 8/1999 |

(56) References Cited

FOREIGN PATENT DOCUMENTS

| | | |
|---|---|---|
| GB | 2093610 A | 9/1982 |
| GB | 2144854 A | 3/1985 |
| GB | 2342081 A | 4/2000 |
| GB | 2390902 A | 1/2004 |
| GB | 2424949 A | 10/2006 |
| GB | 2436206 A | 9/2007 |
| WO | 84-03153 A1 | 8/1984 |
| WO | 96-21163 A1 | 7/1996 |
| WO | 97-11395 A2 | 3/1997 |
| WO | 97-30361 A1 | 8/1997 |
| WO | 97-45006 A1 | 12/1997 |
| WO | 98-28636 A1 | 7/1998 |
| WO | 2000-020895 A1 | 4/2000 |
| WO | 2001-029580 A1 | 4/2001 |
| WO | 2004-092771 A2 | 10/2004 |
| WO | 2005-062075 A1 | 7/2005 |
| WO | 2006-014750 A2 | 2/2006 |
| WO | 2007-070499 A2 | 6/2007 |
| WO | 2008-144492 A2 | 11/2008 |
| WO | 2010-002600 A2 | 1/2010 |

OTHER PUBLICATIONS

PCT Search Report and Written Opinion; PCT/US2010/062419; Sep. 26, 2011.
PCT Search Report and Written Opinion; PCT/US2010/035063; Dec 29, 2010.
PCT Search Report and Written Opinion; PCT/US2009/060864; May 1, 2010.
PCT Search Report and Written Opinion; PCT/US2009/063538; Apr. 30, 2010.
PCT Search Report and Written Opinion; PCT/US2009/047015; Feb. 24, 2010.
PCT Search Report and Written Opinion; PCT/US2009/047019; Jan. 7, 2010.
PCT Search Report and Written Opinion; PCT/US2009/045261; Dec. 23, 2009.
PCT Search Report and Written Opinion; PCT/US2008/063875; Sep. 16, 2009.
UKIPO examination report (Aug. 10, 2009) and search report (Aug. 7, 2009) for GB 0912870.3.
SIPO Reexamination Notice After Final (May 4, 2014); CN 200880021257.8.
EPo Search Report (Mar. 25, 2014); EP 2010778189.0.
EPO Office Action (Dec. 4, 2013); EP 2008755677.3.
Mexican associate reporting dated Oct. 2013 for IMPI Office Action (Jul. 8, 2013); MX/a/2012/007769.
UKIPO Examination Report (Oct. 16, 2012); GB 1216841.5.
UKIPO Examination Report (Jul. 2, 2012); GB 1019201.1.
PCT Search Report and Written Opinion; PCT/US2009/031396; May 14, 2009.
IPAU Examination Report (Jun. 21, 2012); AU 2008254856.
SIPO Rejection Decision (Jun. 6, 2012) and SIPO Office Actions (Feb. 6, 2012 and Jul. 20, 2011); CN 200880021257.8.
Mexican associate reportings dated Jul. 2012, Oct. 2011, and Apr. 2011 for IMPI Office Actions; MX/a/2009/012362.
UKIPO Examination Reports (May 18, 2012 and Feb. 13, 2012); GB 1019199.7.
Mexican associate reportings dated Aug. 2012 and Mar. 2012 for IMPI Office Actions; MX/a/2010/013018.
IPAU Examination Report (May 16, 2008); AU 2006252148.
SIPO Office Action (Nov. 19, 2010); CN 200710003980.0.
UKIPO Examination Reports (Jun. 8, 2010,Mar. 17, 2010,Nov. 13, 2009, Aug. 10, 2009, and Feb. 6, 2009) and UKIPO Search Report (Jul. 18, 2007); GB 0700970.9.
Mexican associate reporting dated Jun. 2009 for IMPI Office Action; PA/a/2007/000733.
Moldoveanu, et al; Full Azimuth Imaging Using Circular Geometry Acquisition; Leading Edge; vol. 27, No. 7; pp. 908-913; Jul. 2008.
Moldoveanu; "Circular Geometry for Wide-Azimuth Towed-Streamer Acquisition"; EAGE; Jun. 2008.
Hennenfent, et al.; "Simply Denoise: Wavefield Reconstructions via Jittered Undersampling"; Geophysics; vol. 73(2); pp. v19-v28; May-Jun. 2008.
Hennenfent, et al.; "Random Sampling: New Insights into the Reconstruction of Coarsely-Sampled Wavefields"; SEG Annual Meeting; pp. 2575-2579; Oct. 2007.
WesternGeco Q-Technology URL: http://www.westerngeco.com/content/services/q_technology/index.asp 2006—No Longer Exists.
Bacon, et al.; "3-D Seismic Interpretation"; Cambridge University Press; pp. 18-22 and 25-26; 2003.
Sukup; "Wide Azimuth Marine Acquisition by the Helix Method": The Leading Edge; pp. 791-794; Aug. 2002.
Pan; "Single-Sensor Towed Streamer Improves Seismic Acquisition"; Offshore; Apr. 2002.
Austad, et al.; Marine Seismic Cable Streering and Computerized Control Systems; Society of Exploration Geophysicists, Expanded Abstracts; 2000.
Bittleston, et al; Marine Seismic Cable Streering and Control; EAGE 62nd Conference and Technical Exhibition, Glasgow, Scotland; May-Jun. 2000.
Beasley, et al.; A New Look at Simultaneous Sources; SEG Expanded Abstracts; 1998.
Wong, et al.; "Sampling with Hammersley and Halton Points"; 2 Journal of Graphics Tools; pp. 9-24; 1997.
Pedersen; A Nautical Study of Towed Marine Seismic Streamer Cable Configurations; Norwegian University of Science and Technology Doctoral Thesis; 1996.
Pedersen; Active 3-D Position Control of Marine Flexible Cylinder Cables with Extremely Large Length/Diameter-Ratio; NTH Department of Marine Hydrodynamics; 1994-1995.
Reilly, et al; "Concentric Circle 3D: Optimization of Salt Diapir Flank Imaging UK Central North Sea"; First Break; vol. 12, No. 9; pp. 463-475; Sep. 1994.
Shames; Mechanics of Fluids, 3rd Ed.; McGraw-Hill; pp. 666-693; 1992.
Pedersen; A Feasibility Study of the Possibilty to Control the Horizontal Position of Seismic Streamer Cables; Division of Marine Hydrodynamics, The Norwegian Institute of Technology; Mar. 1992.
Raven; Automatic Control Engineering, 4th Ed.; McGraw-Hill; 1987.
Cole, et al.; "A Circular Seismic Acquisition Technique for Marine Three Dimensional Surveys"; Offshore Technology Conference, 4864; Houston, Texas; May 6-9, 1985.
Shames; Engineering Mechanics—Statics and Dynamics, 3rd Ed.; Prentice Hall; pp. 236-244; 1980.
Longobardo; Automatic Controls; Standard Handbook for Mechanical Engineers (Baumeister); pp. 16-33 through 16-34; 1967.
Lee; An Algorithm for Path Connections and its Applications; IRE Transcations on Electronic Computers; pp. 346-365; Sep. 1961.
Kalman; A New approach to Linear Filtering and Prediction Problems; Trans of ASME-Journal of Basic Engineering; vol. 82 (Series D); pp. 35-45; 1960.

* cited by examiner

FIG. 7
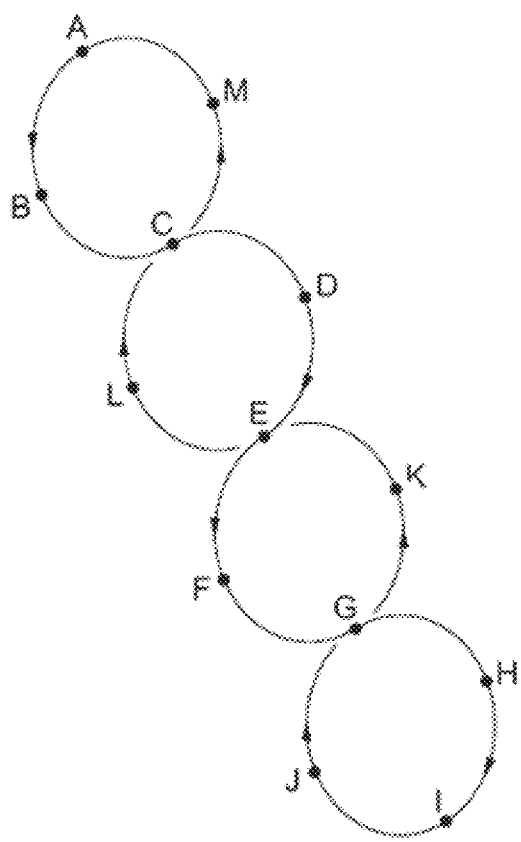
FIG. 8
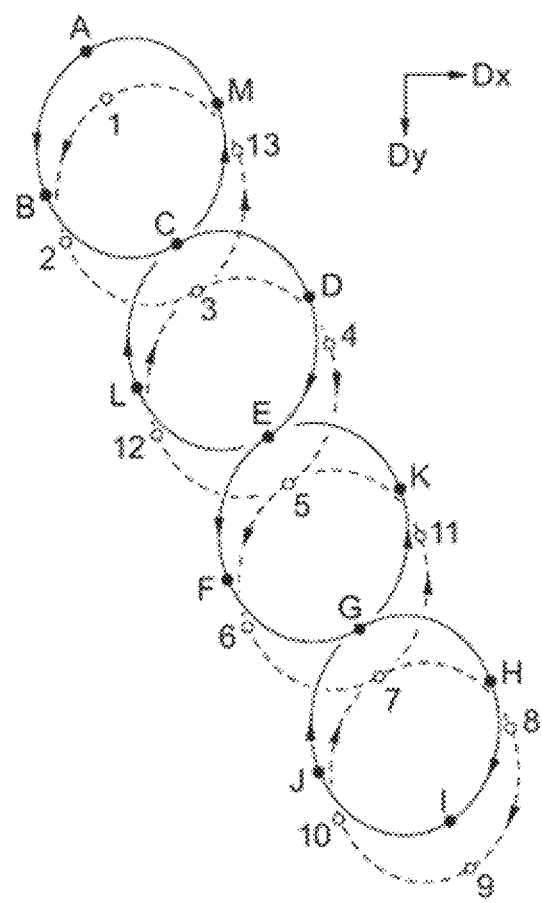
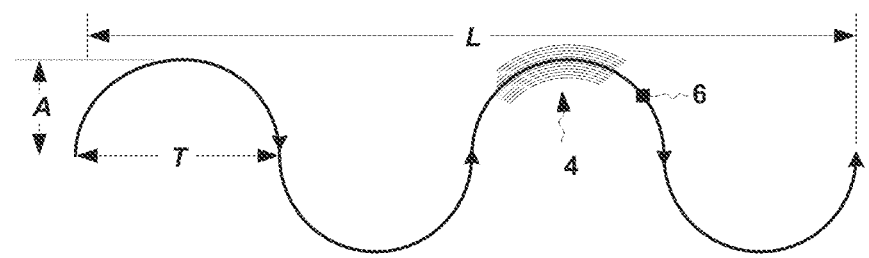
FIG. 11

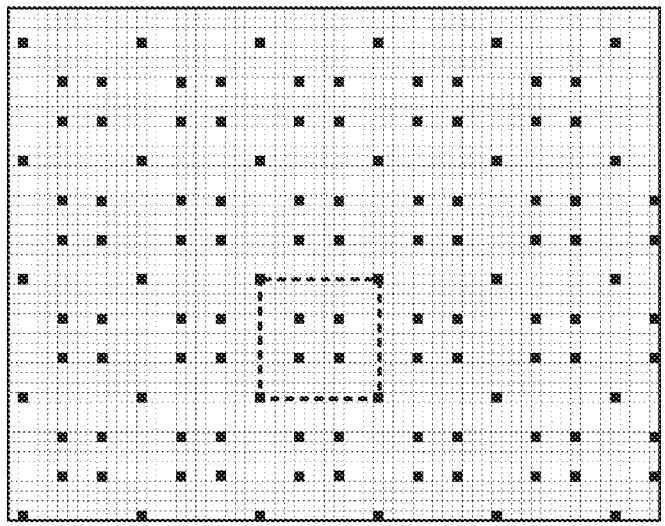
*FIG. 27*
$D_c=D_r=12, Z_c=Z_r=3$
*FIG. 28*
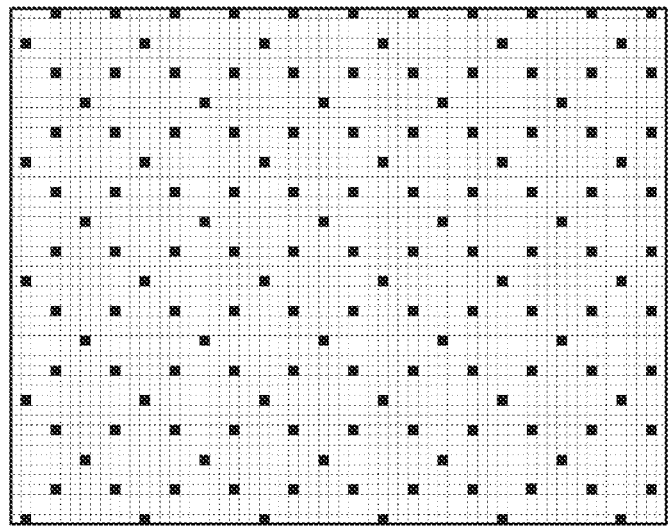
$D_c=D_r=12, Z_c=Z_r=4$ $D_c=D_r=12, Z_c=Z_r=6$ $D_c=D_r=12, Z_c=Z_r=6$ and 2

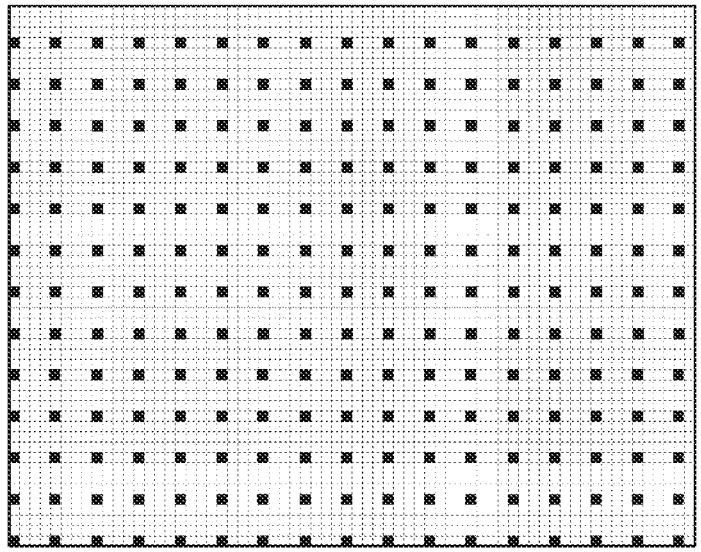
$D_c = D_r = 4, Z_c = Z_r = 0.5$
FIG. 31
FIG. 32
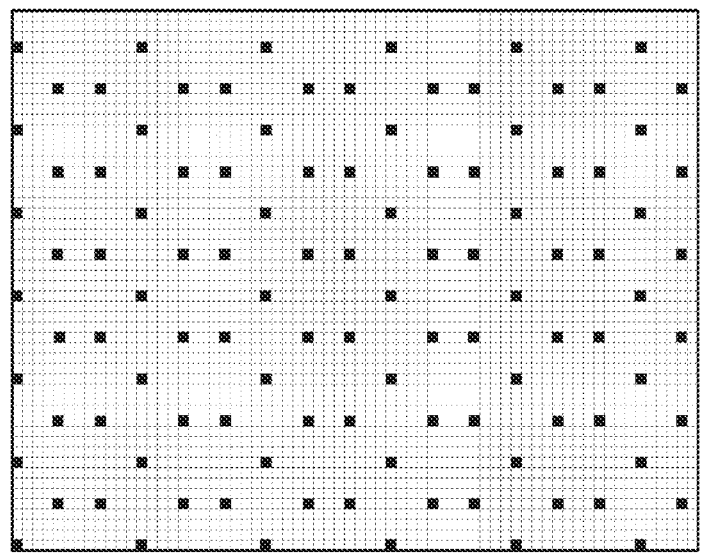
$D_c = 8, D_r = 12, Z_c = Z_r = 2$

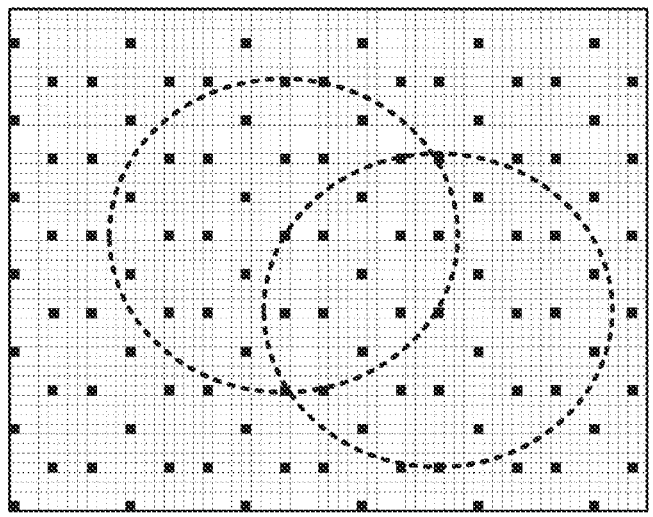
$D_c=8, D_r=12, Z_c=Z_r=2$
FIG. 33
FIG. 34
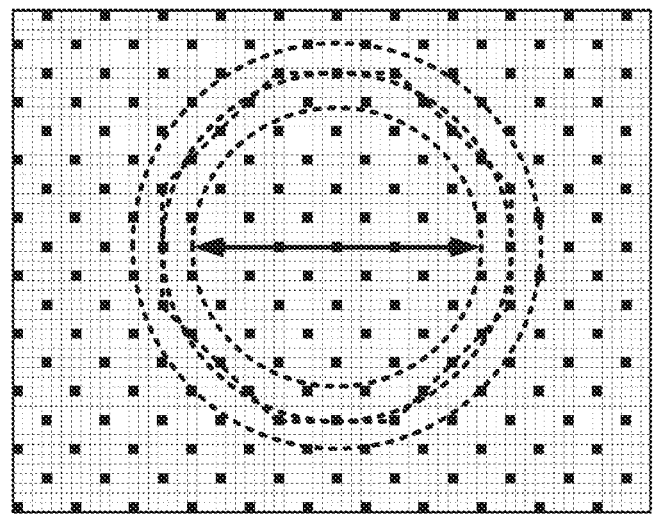
$D_c=D_r=6, Z_c=Z_r=2$ $D_c = D_r = 6, Z_c = Z_r = 2$ $D_c = D_r = 6, Z_c = Z_r = 2$

ACQUIRING AZIMUTH RICH SEISMIC DATA IN THE MARINE ENVIRONMENT USING A REGULAR SPARSE PATTERN OF CONTINUOUSLY CURVED SAIL LINES

CROSS-REFERENCE TO RELATED APPLICATIONS

This application is a continuation of U.S. patent application Ser. No. 12/351,156 filed Jan. 9, 2009, now U.S. Pat. No. 8,488,409 issued Jul. 16, 2013, which claims the benefit of U.S. Provisional Patent Application Ser. No. 61/105,535 and which is also a continuation-in-part of U.S. patent application Ser. No. 12/121,324 filed May 15, 2008 which claims the benefit of U.S. Provisional Patent Application Nos. 60/969,203 filed Aug. 31, 2007, 60/966,534 filed Aug. 9, 2007 and 60/938,547 filed May 17, 2007; all of these applications are incorporated by reference herein in their entireties.

BACKGROUND OF THE INVENTION

1. Field of the Invention

The present invention pertains to towed-array marine seismic surveying, and, more particularly, to sail line determinination in towed-array marine seismic surveying.

2. Description of the Related Art

This section of this document is intended to introduce various aspects of the art that may be related to various aspects of the present invention described and/or claimed below. This section provides background information to facilitate a better understanding of the various aspects of the present invention. As the section's title implies, this is a discussion of related art. That such art is related in no way implies that it is also prior art. The related art may or may not be prior art. It should therefore be understood that the statements in this section of this document are to be read in this light, and not as admissions of prior art.

In many areas of the world hydrocarbon reservoirs located in structurally complex areas may not be adequately illuminated even with advanced towed-array acquisition methods. For example, the shallow, structurally complex St. Joseph reservoir off Malaysia produces oil and gas in an area that poses many surveying and imaging challenges. Strong currents, numerous obstructions and infrastructure, combined with difficult near-surface conditions, may hinder conventional survey attempts to image faults, reservoir sands, salt domes, and other geologic features.

To achieve high density surveys in regions having a combination of imaging and logistical challenges, a high trace density and closely spaced streamers may be used. However, this presents the potential of entangling and damaging streamer cables and associated equipment, unless streamer steering devices are closely monitored and controlled. Wide-azimuth towed streamer survey data is typically acquired using multiple vessels, for example: one streamer vessel and two source vessels; two streamer vessels and two source vessels; or one streamer vessel and three source vessels. Many possible marine seismic spreads comprising streamers, streamer vessels and source vessels may be envisioned for obtaining wide- or rich-azimuth survey data.

Several wide- or rich-azimuth techniques are known to the art: Cole et al., "A circular seismic acquisition technique for marine three dimensional surveys," Offshore Technology Conference, OTC 4864, May 6-9, 1985, Houston, Tex., described a concentric circle shooting scheme for obtaining three dimensional marine survey data around a sub-sea salt dome. Another technique was described by Cole et al., in the paper presented at the SEG conference in 1988 "Three dimensional marine data acquisition using controlled streamer feathering," where overlapping circles acquisition is proposed. The concentric circle technique could be useful perhaps when the location of the subsurface feature, like salt dome, is known. The overlapping circles technique could offer an increase in acquisition efficiency versus conventional acquisition.

The present invention is directed to resolving, or at least reducing, one or all of the problems mentioned above.

SUMMARY OF THE INVENTION

The invention includes, in its various aspects and embodiments, a number of methods and apparatuses for determining a sail plan for a towed-array marine seismic survey and for conducting a towed array marine survey.

In a first aspect, the invention includes a method for determining a sail plan for a towed-array marine seismic survey, comprising: dividing a survey area into a regular grid of tiles; and identifying a subset of the tiles as nodes around which continuously curved sail lines are defined. The nodes define regular pattern further comprising: a first subpattern of nodes; and a second subpattern of nodes offset from the first subpattern.

In a second aspect, the invention includes a computer-readable program storage medium encoded with instructions that, when executed by a processor, perform a method for use in conducting a towed array marine survey, the method comprising: dividing a survey area into a regular grid of tiles; and identifying a subset of the tiles as nodes around which continuously curved sail lines are defined. The nodes define regular pattern further comprising: a first subpattern of nodes; and a second subpattern of nodes offset from the first subpattern.

In a third aspect, the invention includes a computing apparatus programmed to perform a method for determining a sail plan for a towed-array marine seismic survey, the method the method comprising: dividing a survey area into a regular grid of tiles; and identifying a subset of the tiles as nodes around which continuously curved sail lines are defined. The nodes define regular pattern further comprising: a first subpattern of nodes; and a second subpattern of nodes offset from the first subpattern.

In a third aspect, the invention includes a method for conducting a towed array marine survey, the method comprising: traversing a plurality of continuously curved sail lines across a survey area, each sail line being relative to a node; and acquiring seismic data while traversing the continuously curved sail lines. The set of nodes defining a regular pattern further comprising: a first subpattern of nodes; and a second subpattern of nodes offset from the first subpattern.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which:

FIG. 6-FIG. 9 are plan, overhead schematic views of other, alternative embodiments of the present invention.

FIG. 11 is a plan or overhead schematic view of one embodiment of the invention in which the generally advancing path is a sinusoidal curve, or "sincurve;"

FIG. 25-FIG. 38 illustrate assorted acquisition patterns in accordance with the present invention.

Figure 1:
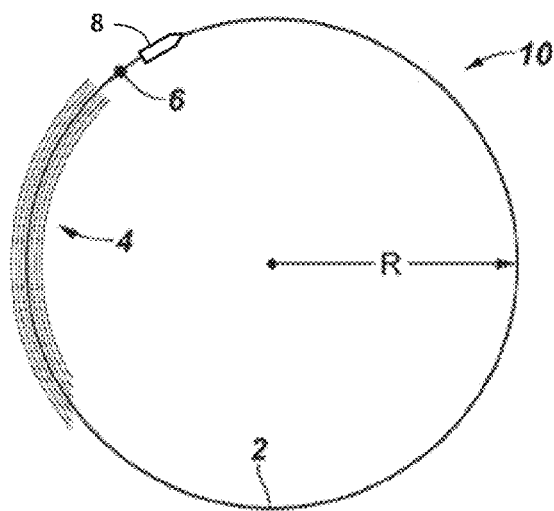
FIG. 1 is a plan, overhead schematic view of a first embodiment of the present invention.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present invention relates to methods for efficiently acquiring marine seismic data, wherein "efficiency" may be considered as more cost effective in that less seismic resources are used, and provide improved seismic imaging using minimal marine seismic equipment. For example, some embodiments may employ only one vessel, although an additional source vessel may be used in other embodiments as will be explained more fully below. A richer azimuth survey can be acquired with the present invention than what is acquired with techniques employed to date that are based on parallel acquisition geometry concept.

The technique disclosed herein may be particularly adept at acquiring wide- and/or rich azimuth marine seismic data, and acquiring such data while traversing generally curved advancing paths, which may be characterized as coil patterns or paths. When viewed in plan view, certain advancing paths useful in the invention may resemble overlapping circles, as in a flattened coil. The time to shoot a survey may be longer with this technique compared to traditional linear surveys. If the same survey can be acquired with 4 vessel configuration sailing generally parallel the total time required may be shorter. However the total cost is higher for multiple vessel marine seismic data acquisition, and multiple vessels are not always available.

A distinct feature of the inventive methods is that the azimuth is changing from shot to shot. This excludes redundancy in the azimuths acquired. Conventional marine acquisition, in contrast, is based on a parallel acquisition geometry that implies azimuth redundancy. A wider azimuth range can be acquired with conventional parallel geometry by adding extra vessels or by repeating the survey with different cross-line offsets. However both of these options add to the cost of the seismic survey.

Although many configurations of source tow vessel and streamer tow vessel may be employed in accordance with the invention, rich- or wide-azimuth towed streamer marine seismic surveys may be acquired in accordance with the technique disclosed herein using a single streamer vessel towing multiple streamers and a minimum of one source array. In certain embodiments the methods include positioning of streamers and/or sources employing positioning apparatus or systems (for example satellite-based systems), one or more streamer steering devices, one or more source array steering devices, and/or one or more noise attenuation apparatus or systems. One suitable system, known as Q-MARINE™ and discussed further below, includes these features and may be useful in methods of the invention.

Turning now to the drawings, FIG. 1 depicts a first embodiment 10 useful in practicing one method in accordance with the present invention. FIG. 1 depicts the generally curved advancing path or sail lines 2 of a seismic source 6 and streamers 4 generally circular as illustrated by the heavy dark line. In this embodiment both the streamers 4 and the wide- or rich-azimuth source 6 are towed by the same vessel 8, although this is not required. In other words, the streamers 4 generally follow the circular sail line 2 having a radius R, where R may range from about 5,500 m to 7,000 m or more.

Figure 2:
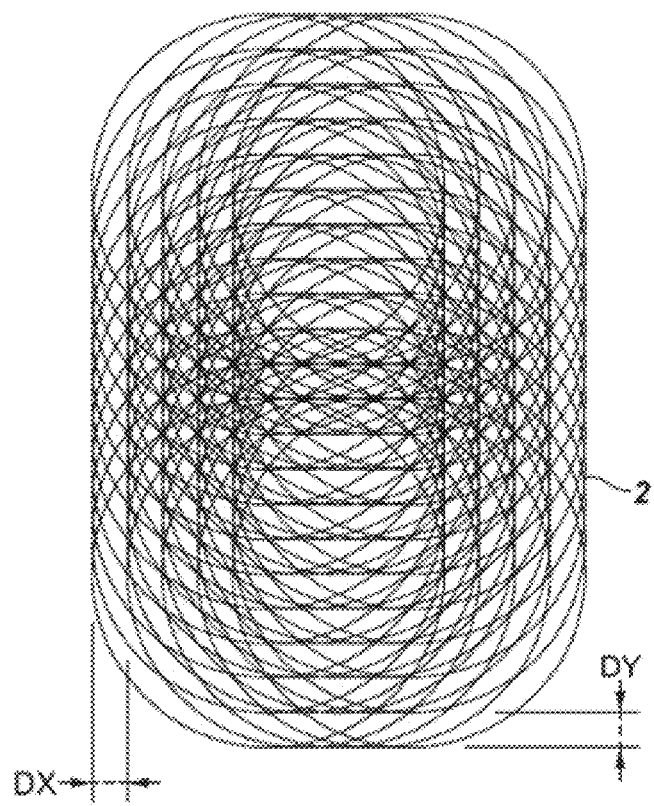
FIG. 2 is a computerized rendition of a plan view of the survey area covered by generally circular sail lines of the embodiment of FIG. 1 over time during a shooting and recording survey.

The sail line or path 2 is not truly circular, as once the first pass is substantially complete, the spread 10 will move slightly in the y-direction (vertical) value of DY, as illustrated in FIG. 2. The spread may also move in the x-direction (horizontal) by a value DX. Note that "vertical" and "horizontal" are defined relative to the plane of the drawing. This is possible with a source vessel such as that known under the trade designation Q™ and marine seismic data acquisition systems known under the trade designation Q-MARINE™, due at least to the following features: accurate positioning system; streamer steering; and advance noise attenuation capabilities due to single sensor acquisition and fine sampling. Note, however, that other conventional marine seismic spreads and vessels may also be used provided that they can be controlled adequately. One example of marine seismic spread that can be used is the solid streamer.

FIG. 2 is a computerized rendition of a plan view of the survey area covered by the generally circular sail lines of the seismic spread and method of FIG. 1 over time during a shooting and recording survey, where the displacement from circle to circle is DY in the vertical direction and DX in the horizontal direction. In FIG. 2, note that several generally circular sail lines 2 (only one indicated) cover the survey area. In this example, the first generally circular sail line was acquired in the southeast ("SE") corner of the survey. When a first generally circular sail path 2 is completed the vessel 8 (shown in FIG. 1) moves along the tangent with a certain distance, DY, in vertical direction, and starts a new generally circular path 2. Several generally circular curved paths 2 may be acquired until the survey border is reached in the vertical direction. A new series of generally circular paths 2 may then be acquired in a similar way, but the origin will be moved with DX in the horizontal direction. This way of shooting continues until the survey area is completely covered.

The design parameters for practicing methods within the invention include the radius R of the circle, the radius being a function of the spread width and also of the coverage fold desired; DY, the roll in the y-direction; DX, the roll in the x-direction. DX and DY are functions of streamer spread width and of the coverage fold desired to be acquired. The radius R of the circle may be larger than the radius used during the turns and is a function of the streamer spread width. The radius R may range from about 5 km to about 10 km. The radius R ranges from 6 km to 7 km in one particular embodiment.

The total number of kilometers acquired over a given area depends on the circle radius R and the values DX and DY. The total number of shots acquired with the coil shooting technique disclosed herein increases with increased radius R. DX and DY may range from about 0.5 W to about 2 W, or from about 0.5 W to about W, where W is the streamer spread width. Certain embodiments where DX=DY=W give a continuity of the surface receiver coverage. Certain embodiments wherein DX=DY=0.5 W give a continuity in subsurface midpoint coverage. The values of DX and DY may be the same or different and may each range from about 500 m to about 1200 m or more. The value of DX and DY may be selected based on the survey objectives. For instance for a development type survey DX and DY should be smaller than for an exploration survey. Also, as DX and DY determine the source sampling, processing requirements should be considered when the survey is designed.

The present technique includes methods wherein the streamer tow vessel and other vessels travel clockwise or counterclockwise. There is no intrinsic advantage of one direction over the other, and the clockwise versus counter-clockwise directions may be selected at the beginning of each new swath as a function of the currents. It is generally not practical to change direction from circle to circle (for example clockwise then counter-clockwise) due to loss of time.

Figure 3:
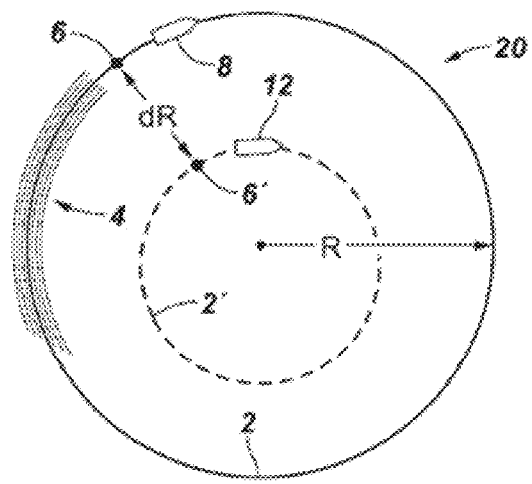
FIG. 3 is a plan, overhead schematic view of a second embodiment of the present invention.

FIG. 3 is a plan, overhead schematic view of a second embodiment 20 of the present invention. In this embodiment, a source tow vessel 12 towing a source 6' following a generally circular advancing path or coil path 2' is used in conjunction with a streamer tow vessel 8 towing a source 6 and streamers 4 following its own generally circular advancing path or coil path 2. One possible position of source tow vessel 12 is illustrated in FIG. 3 at a radius equal to R−dR.

Figure 6:
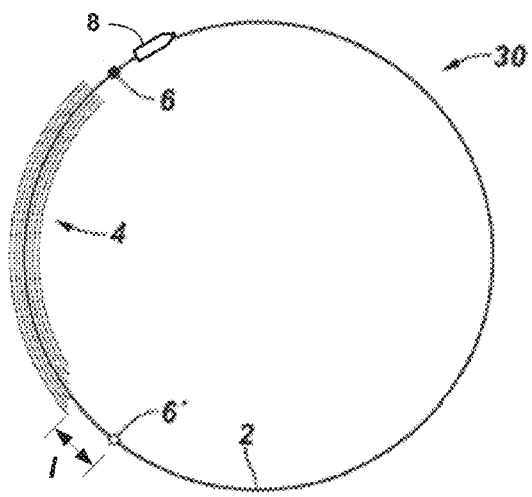

FIG. 6 illustrates a third embodiment 30, in which towing vessels are not illustrated, comprising a second source 6' traveling on the same generally circular advancing path 2 as the source 6 associated with the streamer vessel. The source 6' is positioned behind the streamers 4 at a certain interval or distance I, which is not critical but may range from about 0.5 L to 2.0 L or more where L is the streamer length.

Figure 4:
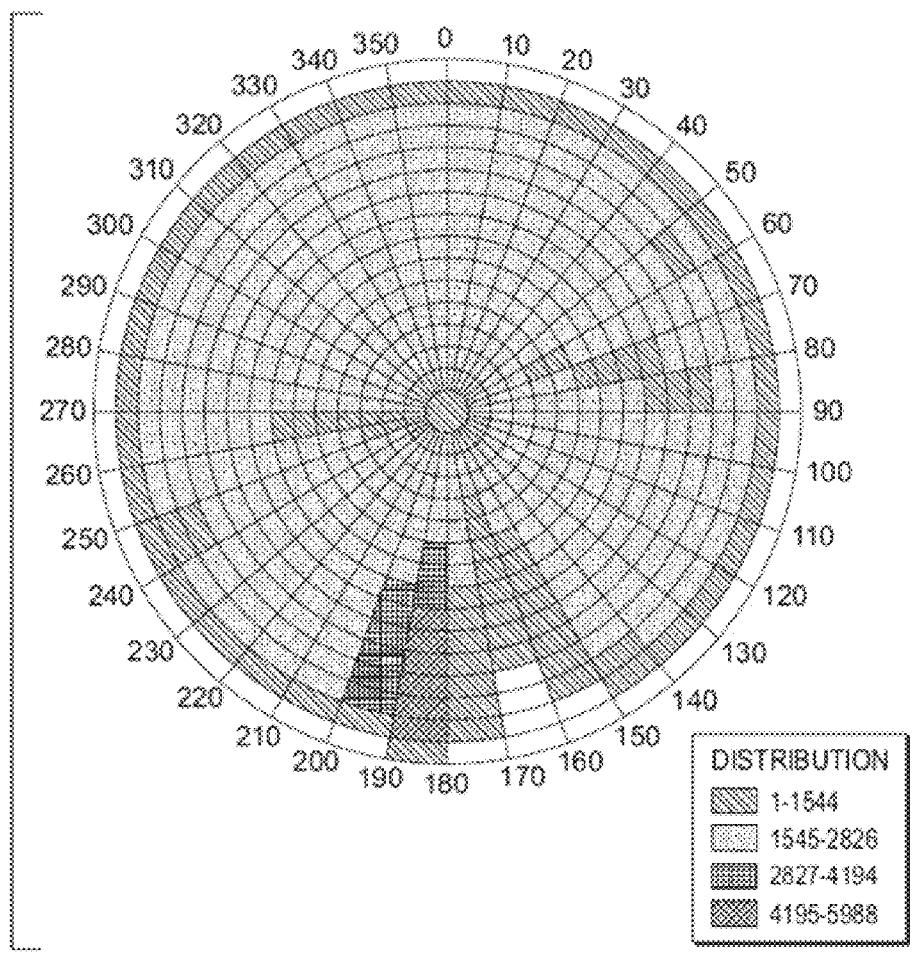
FIG. 4 is a computer rendition illustrating offset and azimuth distribution for a subsurface area of 1000 m×1000 m in accordance with one method of the invention.
Figure 5:
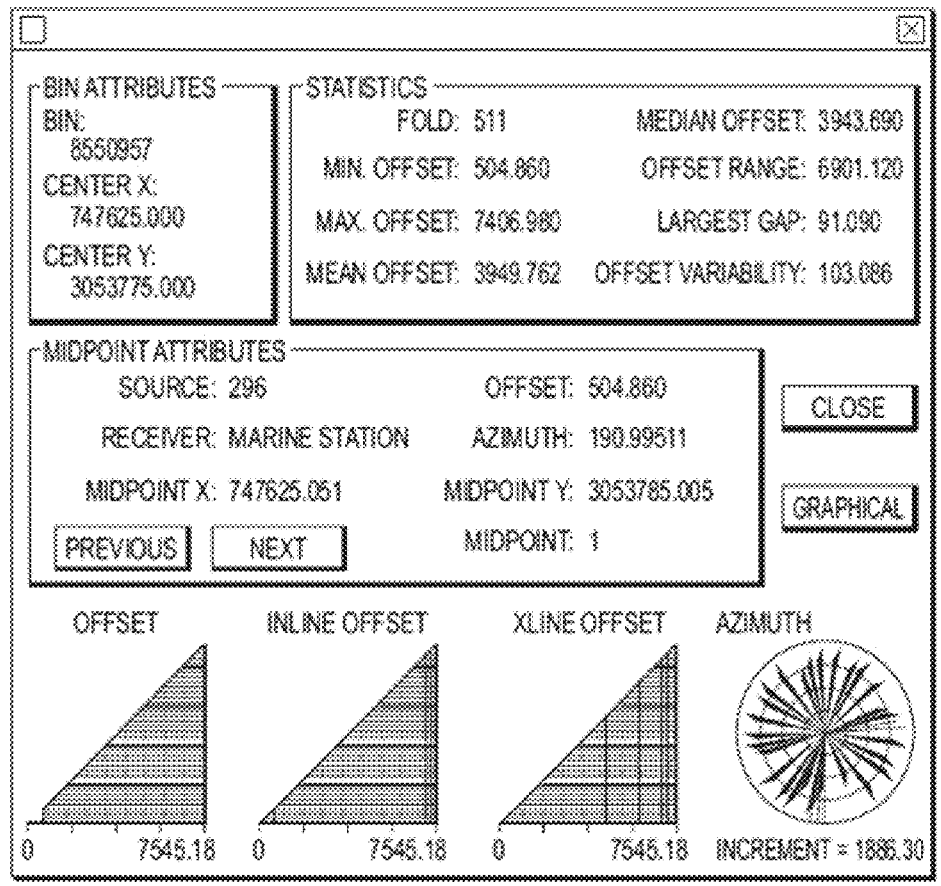
FIG. 5 is a print of a computer display screen illustrating fold, offset and azimuth distribution for a certain bin of seismic data obtained using a method of the invention.

Two possible advantages of methods of various embodiments of the present invention for acquiring rich and/or wide-azimuth towed streamer surveys are illustrated in FIG. 4 and FIG. 5. As illustrated in the computer rendition of FIG. 4, rich azimuth and offset distribution is collected, and very high fold is acquired, as is apparent in FIG. 5, a copy of a computer screen display indicating the results of a method of the present invention.

Another possibility is for a streamer tow vessel and at least one source tow vessel to follow a generally closed curve as illustrated schematically in FIG. 7. The vessels themselves are not shown in FIG. 7, only their generally advancing paths. The streamer tow vessel advances on a general closed curve passing through the following points: A, B, C, D, E, F, G, H, I, J, G, K, E, L, C, M, A. The streamer tow vessel starts at point A and returns to the same point. Once finished with the first path, the spread may move from point A a certain distance DX, in the x-direction, and DY, in the y-direction and a new curve will start as illustrated schematically in FIG. 8. FIG. 8 is an example of two closed curves that are separated by DX and DY distances. The way points of the second path are 1, 2, 3, 4, 5, 6, 7, 8, 9, 10, 11, 12, 13, 1.

Figure 9:
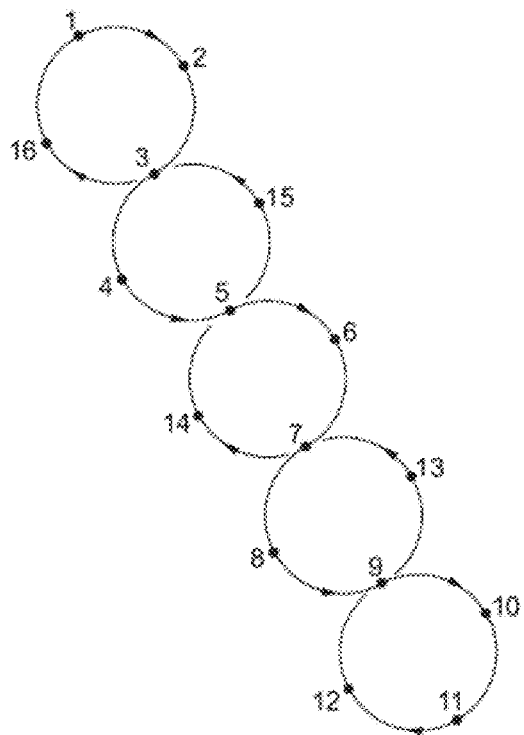

The closed curve could be generated as a series of tangent circles as illustrated schematically in FIG. 9. In this method, of coil shooting acquisition, the streamer tow vessel traverses ½ of a circle and moves to the next circle ("figure 8" pattern) until the survey limit is reached. Then the vessel will traverse in reverse direction acquiring the other semi-circumferences. The next series of circles will be shifted with DX and DY in x-direction and respectively, y-direction. The extent of closed curve in one direction and the total number of closed curves acquired over an area depend on the survey size.

Figure 10A:
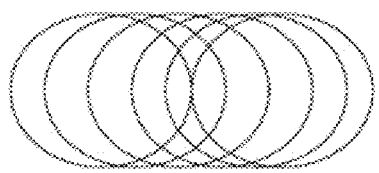
FIG. 10A and FIG. 10B illustrate another embodiment of the present invention, useful in gathering four-dimensional ("4D"), or time lapse, marine seismic data.

The methods of the invention may be used in 4D, or time lapse, marine seismic data acquisition. Consider an acquisition shooting pattern such as the one shown in FIG. 10A. The initial survey (or baseline) is acquired with a very "tight" curved shooting pattern (three-dimensional or four-dimensional baseline). This shooting pattern results in wide- or rich-azimuth seismic data. This seismic data is very finely sampled and provides a good baseline exploration survey. The objective of time lapse surveys is to determine the changes that are occurring in the reservoir as a result of hydrocarbon production. Therefore, in certain embodiments there is a need only to acquire enough seismic data to monitor the changes in the reservoir, and not necessarily to use the time lapse seismic to interpret the geology as in an exploration survey.

Figure 10B:
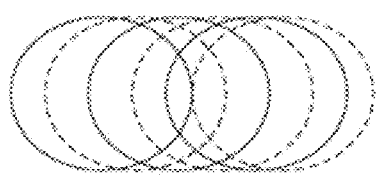

So, while it is necessary to have repeat coverage, it is not necessary that all the previous acquisition traverses are acquired again. In accordance with this aspect of the invention, subsequent time lapse surveys may be acquired with a looser curved shooting pattern where the coils overlay the previous acquisition track, but are not as numerous. This is shown in FIG. 10B, wherein the dashed curves represent traverses from the baseline survey of FIG. 10A that are not repeated. This allows use of wide- or multi-azimuth acquisition in a cost effective way for 4D or time lapse analysis. The data processing on the time lapse may be repeated in comparison to a subset of the original dataset that matches the new coil pattern that is acquired.

To further an understanding of the present technique and its implementation, a more detailed discussion of the marine seismic spread will now be presented. As mentioned above, the illustrated embodiments employ Q™ and Q-MARINE™ technologies. As used herein, "Q™" is the WesternGeco proprietary suite of advanced seismic technologies for enhanced reservoir location, description and management. "Q-MARINE™" systems, as discussed herein, refer to the marine seismic spreads employed by WesternGeco and having an accurate positioning system; streamer steering; and advance noise attenuation capabilities.

In general, in the illustrated embodiments, the streamers are steered through their generally curved advancing paths by controlled steering from streamer steering devices. The position of each seismic acoustic receiver is determined during the turns through acoustic networks, which may or may not be full streamer length acoustic networks. This ability to control the motion of the streamers and determine positions of the receivers during turns allows the marine seismic team to gather valuable reservoir and geologic data with increased efficiency.

In the present discussion of the streamer systems, as used herein:

"wide- and/or rich azimuth seismic survey" means acquiring marine seismic data through a range of (or all) angles that a direct line from a source to a receiver makes with true north. The phrase includes full-azimuth seismic surveys.

"cluster" means a plurality (i.e., more than one) of similar components that are used together.

"geophone" means a device for detecting seismic energy in the form of particle motion during seismic acquisition (land, marine or transition zone environments).

"hydrophone" means a device for detecting seismic energy in the form of pressure changes under water during marine seismic acquisition.

"multicomponent" refers to a combination of seismic data sensors that includes two or more closely-spaced (within a fraction of the minimal wavelength of interest) seismic sensors such as a hydrophone, a geophone, an accelerometer, or a pressure gradient configuration of hydrophones. "4C," for example, refers to a particular type of multicomponent seismic data resulting from the combination of a hydrophone with three orthogonally oriented geophones or accelerometers.

"operatively connected" means directly or indirectly connected for transmitting or conducting information, force, energy or matter.

Many streamers configurations may be useful in the invention, including conventional single component streamers and multicomponent streamers. One set of streamer systems useful in the invention are those described in assignee's published U.S. patent application Ser. No. 11/114,773, filed Apr. 26, 2005, published Oct. 26, 2006, as Patent Publication 20060239117 A1 and incorporated below. This published patent application describes streamer systems for acquiring seismic data including a plurality of first cable sections each employing a first sensor configuration therein, and at least one second cable section operatively connected to one or more of the first cable sections and employing a second sensor configuration therein.

In particular embodiments of the streamer system, each of the first cable sections has substantially the same length, and each of the second cable sections has a length substantially less than the length of the first cable sections. The first cable sections may be operatively connected in series to substantially define a single streamer. In such embodiments, the single streamer may include at least one second cable section operatively connected in series with the first cable sections. Accordingly, the one or more second cable sections may be positioned upstream of the first cable sections within the single streamer, or positioned between two of the first cable sections within the single streamer. Alternatively, the single streamer may include at least one second cable section operatively connected in parallel with one or more of the first cable sections. Thus, for example, the single streamer may include three second cable sections connected in parallel with one or more of the first cable sections.

It will be appreciated that in practicing methods of the present invention a plurality of streamers may be operatively connected in parallel to substantially define a streamer array. The streamer array may include at least one second cable section each operatively connected in series with a plurality of the first cable sections within a single streamer. Accordingly, each series-connected second cable section may be positioned upstream of the respective first cable sections within the single streamer, or positioned between two of the first cable sections within the single streamer. Alternatively, such a streamer array may include at least one second cable section each operatively connected in parallel with the streamers. Accordingly, each second cable section may be positioned between two of the streamers, e.g., so as to substantially define a mini-streamer.

Particular embodiments of streamer systems useful in the invention may employ a first sensor configuration adapted for measuring seismic data in an upper part of the frequency band of interest, e.g., having a frequency in the range of approximately 20 Hz to approximately 125 Hz. These embodiments may further employ a second sensor configuration adapted for measuring seismic data in a lower part of the frequency band of interest, e.g., having a frequency in the range of approximately 2 Hz to approximately 20 Hz. It will be appreciated by those skilled in the art that 20 Hz is used as a representative threshold frequency that separates an "upper" frequency portion or band from a "lower" frequency portion or band. Accordingly, the phrase "approximately 20 Hz" means 20 Hz+/− an appropriate margin (e.g., 10 Hz).

In other particular embodiments of streamer systems useful in the invention, the first sensor configuration may include a conventional hydrophone distribution, and the second sensor configuration may include one or more multicomponent sensors. More particularly, the first sensor configuration may include a plurality of hydrophones distributed longitudinally along each first cable section. Thus, the first sensor configuration may include longitudinally spaced hydrophones, or it may include longitudinally-spaced hydrophone clusters.

In particular embodiments wherein the first sensor configuration employs hydrophone clusters, the hydrophone clusters may be arranged to define a pressure gradient configuration. The hydrophone clusters may have a longitudinal spacing from one another not exceeding approximately 3.125 m. The hydrophone clusters may each include at least two transversely-spaced hydrophones. Accordingly, each hydrophone cluster may include three or more hydrophones having a relatively short transverse spacing, e.g., a transverse spacing from one another not exceeding approximately 4-10 cm. Alternatively, the first sensor configuration may include a plurality of hydrophones distributed longitudinally according to a first separation distance, and the second sensor configuration may include a plurality of hydrophones distributed longitudinally according to a second separation distance that is substantially different from the first separation distance. Thus, e.g., the first separation distance may be approximately 3.125 m, 6.25 m or 12.5 m. The second separation distance may lie in a range of approximately 1.5 m to approximately 3 m.

In other useful embodiments of streamer systems useful in the invention, the first sensor configuration may include one or more particle motion sensors therein, such as a particle velocity sensor, a pressure gradient sensor, an accelerometer or a combination of these. In yet other particular embodiments of streamer systems useful in the invention, the second sensor configuration may include one or more particle motion sensors therein. Thus, the particle motion sensors may include at least one of a particle velocity sensor, a pressure gradient sensor, an accelerometer and a combination thereof. Alternatively, the second sensor configuration may include one or more hydrophones. Thus, e.g., the second sensor configuration may include a plurality of longitudinally-spaced hydrophone clusters. In particular embodiments, these clusters may be spaced apart by a separation distance in the range of approximately 1.5 m to approximately 3 m.

The sources used to implement various embodiments of the present invention may be practically any seismic source known to this art. The source may be a conventional impulse type source, such as an airgun, or a conventional sweep source. As mentioned above, one embodiment employs the Q™ and Q-MARINE™ technologies which, as mentioned above, includes the calibrated Q-MARINE™ source. However, the invention is not so limited.

To further an understanding of the technique disclosed herein, a discussion of controlling and positioning elements of the marine seismic spread will now be presented. In the following discussion regarding controlling the spread and positioning the various elements thereof, the term or phrase:

"without the need for the spread to repeat a path once traversed" means that methods and systems of the invention do not require a marine seismic spread to repeat a particular path to obtain wide- and/or rich azimuth seismic survey data.

"spread" and the phrase "seismic spread" are used interchangeably herein and mean the total number of components, including vessels, vehicles, and towed objects including cables, sources and receivers, that are used together to conduct a marine seismic data acquisition survey.

"position," when used as a noun, is broader than "depth" or lateral (horizontal) movement alone, and is intended to be synonymous with "spatial relation." Thus "vertical position" includes depth, but also distance from the seabed or distance above or below a submerged or semi-submerged object, or an object having portions submerged. When used as a verb, "position" means cause to be in a desired place, state or spatial relation. The term may also include orientation, such as rotational orientation, pitch, yaw, and the like.

"control," used as a transitive verb, means to verify or regulate by comparing with a standard or desired value. Control may be closed loop, feedback, feed-forward, cascade, model predictive, adaptive, heuristic and combinations thereof.

"controller" means a device at least capable of accepting input from sensors and meters in real time or near-real time, and sending commands directly to a vessel steering sub-system, and optionally to spread control elements, and/or to local devices associated with spread control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

"PID controller" means a controller using proportional, integral, and derivative features, as further explained herein. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered useful in practicing the methods and systems of the invention.

"spread control element" means a spread component that is controllable and is capable of causing a spread component to change coordinates, either vertically, horizontally, or both, and may or may not be remotely controlled.

"control position," "position controllable," "remotely controlling position" and "steering" are generally used interchangeably herein, although it will be recognized by those of skill in the art that "steering" usually refers to following a defined path, while "control position," "position controllable," and "remotely controlling position" could mean steering, but also could mean merely maintaining position. In the context of the invention, "control position" means we use at least a tracking point position and compare it to a pre-plot path in order to give steering commands to vessel steering elements.

"Real-time" means dataflow that occurs without any delay added beyond the minimum required for generation of the dataflow components. It implies that there is no major gap between the storage of information in the dataflow and the retrieval of that information. There may be a further requirement that the dataflow components are generated sufficiently rapidly to allow control decisions using them to be made sufficiently early to be effective.

"Near-real-time" means dataflow that has been delayed in some way, such as to allow the calculation of results using symmetrical filters. Typically, decisions made with this type of dataflow are for the enhancement of real-time decisions. Both real-time and near-real-time dataflows are used immediately after the next process in the decision line receives them.

phrase "vessel steering sub-system" means any device or collection of components that are capable of generating commands to vessel steering elements, such as rudders, thrusters, and the like, to accomplish the intended movements of the seismic towing vessel. In some embodiments the vessel steering sub-system may include a vessel tracking computer and/or an autopilot. In other embodiments a vessel steering sub-system may bypass conventional tracking and autopilot functions, and may be simply a vessel rudder controller, and/or a vessel thruster controller (these embodiments may be referred to as "steering the vessel directly" using the controller). In yet other embodiments, all of these components (tracking computer, autopilot, rudder controller and thruster controllers) may be employed.

The methods disclosed herein may be used in conjunction with conventional spread control devices. These devices include source steering devices and streamer steering devices. Such devices are often part of the spread and towed by the vessel. For example, a source reference point generally must be within 10 m cross line of the target in order for a source steering device with an ability to move the source 10 m crossline to move the source reference closer to the target.

Methods of the invention may incorporate one of the so-called Advance Spread Control systems and methods described in assignee's co-pending U.S. application Ser. No. 11/122,646, filed Mar. 5, 2005, published Nov. 16, 2006 as Patent Publication No. 2006/0256653, and incorporated below. In these systems and methods, a marine seismic spread includes a vessel-mounted acoustic Doppler current meter to measure at least a horizontal component of a current velocity vector at least at one location generally ahead of the seismic spread elements, and a controller adapted to use at least the horizontal component of the measured current velocity vector to control position of a seismic spread element. The controller may control position either before the spread element encounters the measured current ahead of the vessel, or when the spread element passes by the point or location where the current was measured.

The described systems may include a seismic spread comprising one or more vessels such as towing vessels, a chase vessel, a work vessel, one or more a seismic sources, and one or more seismic streamers towed by towing vessels. The streamers and sources may be separately towed or towed by the same vessel, and the acoustic Doppler current meter may be mounted on a chase vessel, a work vessel, an automated underwater vehicle ("AUV"), or a tow vessel, as long as it is able to provide the desired data, and may comprise a transducer that produces at least one beam that is horizontal and forward looking, or has a useable forward-looking horizontal component, and may be adapted to measure a current velocity vector at a point ahead of the towing vessel. The controller may control position of all or some of the spread elements through commands given to spread control elements, such as deflectors, steerable birds, and the like. Optionally, the vessel-mounted acoustic Doppler current meter may be motion-compensated.

Controllers useful in the systems and methods of the invention may vary in their details. One PID controller useful in the invention may be expressed mathematically as:

$$u(t)=Kp[e(t)+1/Ti \cdot \int e(t)dt + Td \cdot \dot{e}(t)] \quad (1)$$

wherein:
∫=integrate;
ė(t)=the time derivative;
u(t)=controller output, either meters across to a tracking control device such as that known under the trade designation Robtrack/STS500, or heading to an autopilot;
e(t)=difference between wanted (planned, reference) and measured (current position, y) value;
Td≡a constant for describing the derivative part of the algorithm (the derivative part may be filtered to avoid deriving high frequencies);
Ti≡a constant for describing the integrating part of the algorithm; and
Kp≡a proportional gain constant.

In the s-plane (Laplace), the PID controller may be expressed as:

$$Hr(s)=Kp[1+1/Ti\ s+Td\ s/(1+Tf s)] \quad (2)$$

wherein:
s=the variable in the s-plane; and
$T_f$=a constant describing the filtering part of the derivative part of the algorithm.

For discretization, a variety of transforms may be employed, and some constants may or may not be useful. For example, the Tf constant may not be necessary in some instances, but may be especially useful in other scenarios. As one discretization example, the z-transform may be used, meaning that the integral part of the algorithm may be approximated by using a trapezoid model of the form:

$$s=(1-z-1)/T \quad (3)$$

while the derivative part may be approximated using an Euler model:

$$s=2/T \cdot (1-z-1)/(1+z-1) \quad (4)$$

wherein T is the sampling time. The resulting discrete model may then be used directly in the steering algorithm. Other discrete models, derived using other transforms, are useful in the invention, and will be apparent to control technicians or control engineers of ordinary skill.

Model Predictive Control ("MPC") is an advanced multi-variable control method for use in multiple input/multiple output ("MIMO") systems. An overview of industrial Model Predictive Control can be found at: www.che.utexas.edu/~qin/cpcv/cpcv14.html. MPC computes a sequence of manipulated variable adjustments in order to optimize the future behavior of the process in question. At each control time k, MPC solves a dynamic optimization problem using a model of the controlled system, so as to optimize future behavior (at time k+1, k+2 ... k+n) over a prediction horizon n. This is again performed at time k+1, k+2 .... MPC may use any derived objective function, such as Quadratic Performance Objective, and the like, including weighting functions of manipulated variables and measurements.

Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like.

It may be difficult to explicitly state stability of an MPC control scheme, and in certain embodiments of the present invention it may be necessary to use nonlinear MPC. In so-called advance spread control of marine seismic spreads, PID control may be used on strong mono-variable loops with few or non-problematic interactions, while one or more networks of MPC might be used, or other multivariable control structures, for strong interconnected loops. Furthermore, computing time considerations may be a limiting factor. Some embodiments may employ nonlinear MPC.

Feed forward algorithms, if used, will in the most general sense be task specific, meaning that they will be specially designed to the task they are designed to solve. This specific design might be difficult to design, but a lot is gained by using a more general algorithm, such as a first or second order filter with a given gain and time constants.

The introduction of a tracking point may serve at least two purposes. First, it gives a more flexible solution for a track that we want parts of the spread to follow. Second, if other means are used for controlling source positions, like a winch or a source deflector, the vessel will in many occasions have "spare" steering capacity available. This may mean that by moving the tracking point aft of the sources, streamer front ends and consequentially also the receivers may be closer to where they should be, which may help the streamer steering devices, such as those known under the trade designation Q-FIN, available from WesternGeco, L.L.C., in achieving their steering objectives.

In certain embodiments, a tracking point will not be a static point in the spread, as time varying currents may result in the center of source steering objective and the tracking point steering objective unable to be met at the same time. In these embodiments, the tracking point may be moved, either dynamically or non-dynamically, until both objectives can be met with a certain slack. The reverse might also be the case, i.e., having excess steering power resulting in moving the tracking point further aft. If the movement of the tracking point is above a predefined distance, a new set of parameters for both the controller and the feed forward controller may be used to optimize the controller performance.

The control systems and methods discussed herein may be used in the spread embodiments disclosed herein as well as other spread configurations. For example, for obtaining deghosted seismic data, it may be possible to provide one or more seismic streamers with a companion seismic streamer where the companions are towed in over/under fashion. The vertical distance between seismic streamers in an over/under seismic streamer pair may range from 1 m to 50 m or more. In one particular embodiment, the vertical distance may be about 5 m. A selected number of hydrophones, either mounted within the seismic streamer or in/on equipment mounted onto the seismic streamer, may be used as receivers in an acoustic ranging system and thereby provide knowledge of the horizontal and vertical position of seismic streamers.

In order to acquire towed streamer marine seismic data during a generally curved advancing path or coil path, the position of acoustic receivers, streamer steering, and noise attenuation are important factors. The streamer tow vessel and streamers may be part of a system known under the trade designation Q-MARINE™, from WesternGeco. In these systems, streamers may be equipped with acoustic transmitters and point receivers for accurate position determination, employing intrinsic ranging modulated acoustics, as taught in U.S. Pat. No. 5,668,775 ("the '775 patent"), incorporated below.

As taught in the '775 patent, the streamer transmitters and point receivers may form a full-streamer-length acoustic network, wherein a unique spread spectrum code of acoustic frequencies are emitted by each of a plurality of acoustic transmitters placed within the streamers, all frequencies being within the seismic frequencies detected by the same receivers during shooting and recording, and the point receivers within the streamers are able to distinguish each transmitter's unique code. Thus, accurate positioning of seismic receivers is possible. Conventional streamers use arrays of hydrophones, such as 12 or 18 hydrophones per group, which are summed together in analog fashion and than recorded.

Systems known Q-MARINE™ use single sensors or point receivers: these are placed in the streamer at intervals, for example one every 3 m to 4 m, and recorded. All point receivers route data to a computer, where digital filters are applied taking advantage of the very fine sampling of the receivers for very powerful coherent noise attenuation of line swell noise and/or streamer cable noise. During the turns the noise from marine current may be stronger, since at least portions of the streamers may be traveling cross-current. This is one reason shooting during turns is not possible with conventional streamers. With systems known as Q-MARINE™, noise can be attenuated from each point receiver very well. Furthermore, streamers may be steered into desired positions by steering devices, as further described herein.

Shooting and recording in the generally curved advancing paths is made possible through the combination of steering of streamers and acoustic positioning networks, and optionally noise attenuation if necessary through digital filtering signals from point receivers in the streamers. Furthermore, the ability to acquire towed streamer marine seismic data during the coiled paths increases data quality by providing richer azimuth data.

Methods of the invention may employ any number of spread control elements, which may include one or more orientation members, a device capable of movements that may result in any one or multiple straight line or curved path movements of a spread element in three dimensions, such as lateral, vertical up, vertical down, horizontal, and combinations thereof. The terms and phrases "bird," "cable controller," "streamer control device" and like terms and phrases are used interchangeably herein and refer to orientation members having one or more control surfaces attached thereto or a part thereof.

A "steerable front-end deflector" (or simply "deflector") such as typically positioned at the front end of selected streamers, and other deflecting members, such as those that may be employed at the front end of seismic sources or source arrays, may function as orientation members in some embodiments, although they are primarily used to pull streamers and steer sources laterally with respect to direction of movement of a tow vessel. Horizontal separation between individual streamers may range from 10 to about 200 meters. The horizontal streamer separation may be consistent between one streamer and its nearest neighboring streamers. Horizontal and/or vertical control of streamers may be provided by orientation members (not illustrated) which may be of any type as explained herein, such as small hydrofoils or steerable birds that can provide forces in the vertical and/or horizontal planes.

One suitable orientation member is the device known under the trade designation Q-FIN™, available from WesternGeco L.L.C., and described in U.S. Pat. No. 6,671,223, describing a steerable bird that is designed to be electrically and mechanically connected in series with a streamer; another suitable device is that known under the trade designation DIGIBIRD™, available from Input/Output, Inc., Stafford, Tex. Other streamer positioning devices, such as the devices described in U U.S. Pat. No. 3,774,570; U.S. Pat. No. 3,560,912; U.S. Pat. No. 5,443,027; U.S. Pat. No. 3,605,674; U.S. Pat. No. 4,404,664; U.S. Pat. No. 6,525,992 and EP Patent Publication No. EP 0613025, may be employed.

Systems used in practicing methods of the invention may communicate with the outside world, for example another vessel or vehicle, a satellite, a hand-held device, a land-based device, and the like. The way this may be accomplished varies in accordance with the amount of energy the system requires and the amount of energy the system is able to store locally in terms of batteries, fuel cells, and the like. Batteries, fuel cells, and the like may be employed, and wireless communication may be sufficient. Alternatively, or in addition, there may be a hard-wire power connection and a hard wire communications connection to another device, this other device able to communicate via wireless transmission.

Certain methods of the invention may work in feed-forwarded fashion with existing control apparatus and methods to position not only the tow vessels, but seismic sources and streamers. Sources and streamers may be actively controlled by using GPS data or other position detector sensing the position of the streamer (e.g., underwater acoustic network), or other means may sense the orientation of one or more individual streamers (e.g., compass) and feed this data to navigation and control systems. While gross positioning and local movement of one or more tracking points, centers of sources and/or a streamer front end center may be controlled via controlling one or more tow vessels, fine control may be accomplished on some other vessel, locally, or indeed a remote location.

By using a communication system, either hardwired or wireless, environmental information ahead of the vessel may be sent to one or more local controllers, as well as the controller for each vessel. The local controllers may in turn be operatively connected to spread control elements comprising motors or other motive power means, and actuators and couplers connected to the orientation members (flaps), and, if present, steerable birds, which function to move the spread components as desired. This in turn adjusts the position of the spread element, causing it to move as desired. Feedback control may be achieved using local sensors positioned as appropriate depending on the specific embodiment used, which may inform the local and remote controllers of the position of one or more orientation members, distance between streamers, a position of an actuator, the status of a motor or hydraulic cylinder, the status of a steerable bird, and the like. A computer or human operator can thus access information and control the entire positioning effort, and thus obtain much better control over the seismic data acquisition process.

In accordance with the present invention, methods are described for acquiring marine seismic data that may be more cost effective and provide improved seismic imaging compared to presently employed methods. Methods of the invention comprise acquiring wide- or rich-azimuth data (as defined herein to include full azimuth data) using a streamer vessel (for example, a single streamer vessel, such as a Q-TECHNOLOGY™ streamer vessel) towing multiple streamer cables using one or more calibrated marine seismic sources (in certain embodiments Q-MARINE™ sources), wherein the streamer vessel and the one or more source arrays traverse a generally curved advancing shooting pattern. In certain embodiments one or more source arrays may traverse a smaller or larger curved pattern than the streamer vessel.

As used herein the phrase "generally curved advancing path" means that the vessels and streamers travel generally in a curve, and there is an advancement in one or more of the x- and y-directions, as explained further herein. The path may be expressed as a coil. The curve may be circular, ovoid (including one or more ovals), elliptical (including one or more ellipses), FIG. 8, sinusoidal, or other curved path. The path may vary within the same survey; for example, a first portion of the survey may follow an ovoid path, a second portion of the survey may follow an elliptical path, as one of many examples. In addition, as explained in referenced to FIG. 10A and FIG. 10B for time lapse seismic, the subsequent paths may be different from the first or "baseline" path.

As used herein the phrase "tow vessel" includes both streamer tow vessels and source tow vessels; a "streamer tow vessel" means a vessel towing one or more seismic streamer cables, with or without one or more seismic sources; and "source tow vessel" means a vessel towing at least one seismic source, with or without one or more streamers.

Methods of the invention include those wherein there is more than one streamer in the spread, and the distance between streamers is substantially maintained by a plurality of actively controlled streamer steering devices, such as those known under the trade designation Q-FIN™, available from WesternGeco L.L.C., although the invention is not limited to this particular type of streamer steering device.

Combinations of the methods of the invention may be practiced, wherein shooting and recording during the generally curved advancing pattern is performed along with positioning the source and streamer(s) to acquire a wide- and/or rich azimuth seismic survey without the need for the spread to repeat a path once traversed.

Methods of the invention include those wherein split-spread seismic data is acquired by acquiring seismic data simultaneously on one or more seismic source lines, including embodiments wherein the deploying of one or more tow vessels comprises deploying a streamer tow vessel, and methods including deploying one or more source tow vessels starboard of the streamers and one or more source tow vessels positioned port of the streamers, wherein the starboard and port distances are either the same or different, and all vessels traverse their own generally curved advancing paths. In certain methods, the generally curved advancing paths are generally circular and differ in radius by known, controlled amounts. In certain other methods, the generally curved advancing paths are generally sinusoid curves, the shape of the curves being controlled by the design parameters.

Other methods of the invention comprise collecting split-spread marine seismic data, comprising deploying a streamer tow vessel towing a plurality of streamers in a generally curved advancing path over a sub-sea geologic region, and deploying all of the source tow vessels on the starboard (or port) side of one or more streamer tow members to acquire wide- and/or rich azimuth seismic survey data. Certain of these method embodiments may comprise deploying two or more source tow vessels port of (or starboard of) and positioned ahead of the streamers, and deploying two more source tow vessels port of (or starboard of) and positioned behind the streamers. A variation of these embodiments is deploying two or more sources utilizing the same source tow vessels.

Other methods of the invention comprise controlling the one or more source tow vessels and/or streamer tow vessels with one or more controllers alone or in conjunction with other controllers. Certain methods of the invention may comprise towing one or more streamer tow vessels wherein the streamers are towed in configuration selected from side-by-side configuration, over/under configuration, "V" configuration, "W" configuration or some other configuration.

Methods of the invention may employ multiple, in certain embodiments from 4 to 12 streamer cables, wherein the streamers may be from 1000 m to about 5 km in length, with a separation between streamers ranging from about 25 to about 50 m. Methods of the invention include those which employ so-called "split-spread" systems. These embodiments would comprise passive and/or active deflecting members, such as deflectors known in the art as MONOWING™, available from WesternGeco L.L.C., and other deflectors, such as door-type deflectors.

Methods of the invention for acquiring rich- or wide-azimuth marine seismic data may comprise one or more receiver positioning apparatus or systems, source positioning apparatus or systems, one or more streamer steering devices, one or more source array steering devices, and/or noise attenuation apparatus or systems. Systems known as Q-MARINE™ include these features and may be useful in methods of the invention. Further, all methods of the invention may utilize sequential source shooting or, alternatively, two or more sources may be shot simultaneously, with the sources being encoded so that they may be distinguished during data interpretation. For the same nominal shot point interval, firing two or more sources simultaneously may reduce the shot time interval on each source line compared with sequential shooting.

Methods of the invention may benefit from one or more controllers that control position of one or more tracking points. Tracking points may be anywhere in the marine seismic spread, for example but not limited to the center of a source, a streamer front end center, a streamer back end center, a tracking point somewhere between a center of source and a streamer front end center, a center of a plurality of streamers, a front of any one streamer, and the like. Tracking points may be dynamically or non-dynamically moved within a spread to optimize a given steering strategy, particularly during data acquisition during traversal of the generally curved advancing (coil-like) paths discussed herein. Controllers may be physically a part of the vessel steering sub-system or located separately from the steering sub-system, and may use some or all available information, including, but not limited to, source and vessel positions, vessel gyroscope reading, vessel compass reading, vessel speed log, streamer front end positions (if streamers are present), and historical, real-time, and future current and wind information and predictions when calculating the residual difference, and thus these may be taken into consideration in the calculation of optimum vessel steering path by the vessel steering sub-system.

The phrase "vessel steering sub-system" is defined herein and may differ among the various embodiments of the invention, as explained in the definition. Controllers may be selected from PI controllers, PID controllers (including any known or reasonably foreseeable variations of these), and compute a residual equal to a difference between a tracking point three-dimensional ("3D") coordinate position and a pre-plot track, optionally together with current and wind measurements, to produce a set point input to a vessel steering algorithm used by a vessel steering sub-system. Controllers may compute the residual continuously or non-continuously. Other possible implementations of the invention are those wherein one or more controllers comprise more specialized control strategies, such as strategies selected from feed forward, cascade control, internal feedback loops, model predictive control, neural networks and Kalman filtering techniques. Systems and methods of the invention may be used during seismic data collection, including 3D and 4D seismic surveying.

Methods of the invention may include use of seismic spreads comprising one or more other vessels such as chase vessels, work vessels, and the like. The streamers and sources may be separately towed or towed by the same vessel. If towed by separate vessels, two controllers may be employed and two residuals computed. In general, the controller may compute the residual based on what the position measurement system reports as the 3D coordinate position of the tracking point. Although there may be some degree of error in the reported 3D coordinate position due to a variety of error sources, including instrument measurement error, even with the errors the tracking point may be better controlled by steering the vessel the majority of the time.

Methods of the invention may optionally be used in conjunction with other systems and methods. For example, if the centers of each of the sources are tracking points, their 3D coordinate positions may be determined from acoustic ranging networks, GPS, and other position sensors, and since the seismic team knows the paths each tracking point is supposed to follow based on the survey specifications, the controllers may use at least that information to calculate residuals, and a series of set points based on the residuals, for the steering algorithms of each vessel, either to steer the vessels back to the survey-specified paths, or ensure that the survey-specified paths are adhered to.

A full- or wide-azimuth towed streamer survey may also be acquired in accordance with the present invention using a single streamer vessel comprising multiple streamers and a minimum of one source array. In certain embodiments the methods include positioning of streamers and/or sources employing positioning apparatus or systems (for example satellite-based systems), one or more streamer steering devices, one or more source array steering devices, and/or one or more noise attenuation apparatus or systems.

FIG. 11 represents a sinusoidal curved path 1100 that is followed by the streamer vessel (not shown); T and A are parameters that control the shape of the curve. The extent of the curve, L, as well as T and A parameters are survey design parameters. A first marine seismic spread embodiment 10 useful in practicing one method in accordance with the invention is illustrated schematically, with the generally advancing path or sail lines of a seismic source 6 and streamers 4 generally sincurve as illustrated by the heavy dark line.

In this embodiment both streamers 4 and source 6 are towed by the same vessel (not illustrated). In other words, streamers 4 generally follow the sincurve sail line having the amplitude A and the period T.

Figure 12:
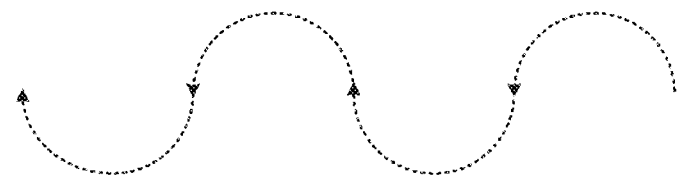
FIG. 12 is a plan view of a sinusoidal curve path symmetrical with the one presented in FIG. 1.

The sincurve parameters A and T are determined based on the survey size, shot density we want to achieve and the effect of the noise on the seismic data. If T=2 A the sincurve corresponds to a series of tangent semi-circles. The length of the sincurve L is typically less or equal with the survey dimension (length or width). The minimum value of L is equal 2 T. If the streamer finished the path along the sincurve it may continue smoothly in a symmetric sincurve that is illustrated in FIG. 12.

Figure 13:
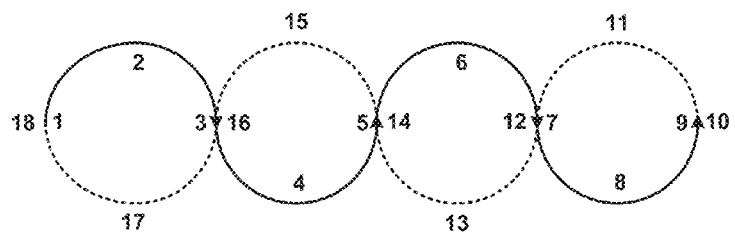
FIG. 13 is another plan view of a combination of two sinusoid curves.

The forward and reverse paths along two symmetrical sincurves are illustrated in FIG. 13. The solid sinusoid path is followed by the streamer vessels in one direction and the symmetric dashed sinusoid path is followed by the streamer vessel in the opposite direction. The way points are: 1, 2, 3, 4, 5, 6, 7, 8, 9 (forward direction) and 10, 11, 12, 13, 14, 15, 16, 17, 18 (reverse direction).

The spread may also move in the x-direction (horizontal) by a value DX. This is possible with a source vessel such as that known under the trade designation Q™ and marine seismic data acquisition systems known under the trade designation Q-Marine™, due at least to the following features: accurate positioning system; streamer steering; and advance noise attenuation capabilities due to single sensor acquisition and fine sampling.

Figure 14A:
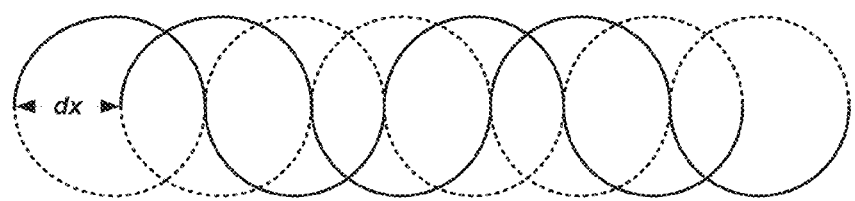
FIG. 14A-FIG. 14B show the sincurves moved in the x direction with DX (FIG. 14A) and in the y-direction with DY (FIG. 14B) to cover the whole survey area.
Figure 14B:
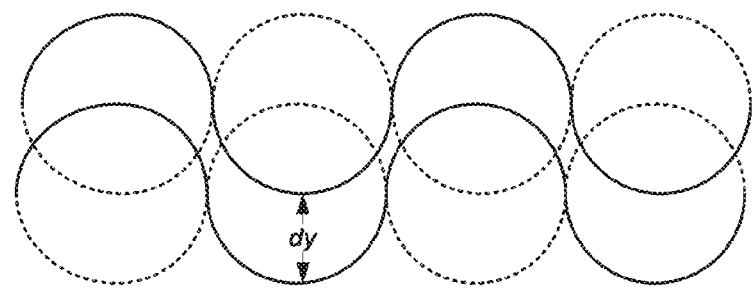
Figure 15:
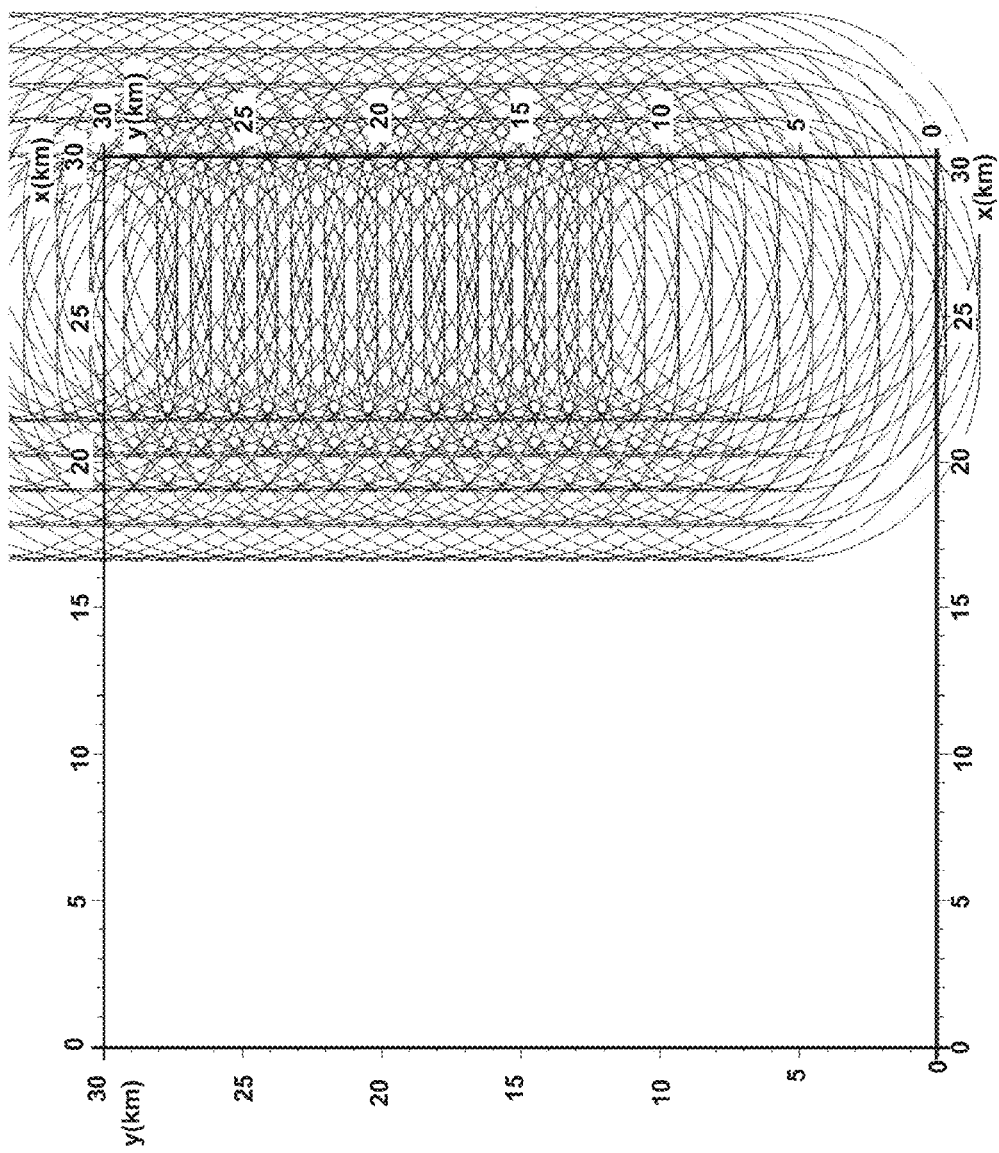
FIG. 15 is a computer simulation of several sincurves moved in x- and y-directions by DX and DY, respectively, to cover a part of the survey area.

FIG. 14A-FIG. 14B are computerized renditions of plan views of the survey area covered by the generally sincurve sail lines of the seismic spread and method of FIG. 11 over time during a shooting and recording survey, where the displacement from sincurve to sincurve is DY in the vertical direction and DX in the horizontal direction. In FIG. 15, note that several sincurves cover the survey area. The starting point of the sincurves versus survey boundary is a design parameter that controls the shot density over the survey area. In this example the first sincurve sail line was acquired in the SE corner of the survey. When a first sincurve sail path is completed the vessel moves with a certain distance, DY, in vertical direction, and starts a new sincurve advancing path. Several sincurve advancing paths may be acquired until the survey border is reached in the vertical direction. A new series of sincurve advancing paths may then be acquired in a similar way, but the origin will be moved with DX in the horizontal direction. This way of shooting continues until the survey area is completely covered.

The design parameters for practicing methods within the invention include the sincurve parameters, A, T and L, DY, the roll in the y-direction; DX, the roll in the x-direction and the starting point of sincurves. DX and DY are functions of streamer spread width and of the coverage fold desired to be acquired. The amplitude A of the sincurve may be larger than the radius used during the turns and is a function of the streamer spread width. The amplitude A may range from about 5 km to about 10 km, and may range from 6 km to 7 km. The period T of the sincurve may range from 10 km to about 25 km. The extent of the sincurve, L, has a minimum value of 2 T, and a maximum value equal with the survey length or survey width and it may range from 20 km to 30 km.

The total number of kilometers acquired over a given area depends on the amplitude A, period T, sincurve length L and the values DX and DY. The total number of shots acquired with the sincurve shooting methods of the invention increases with larger values for A and T parameters. DX and DY may range from about 0.5 W to about 2 W, or from about 0.5 W to about W, where W is the streamer spread width. Certain embodiments where DX=DY=W give a continuity of the surface receiver coverage. Certain embodiments wherein DX=DY=0.5 W give a continuity in subsurface midpoint coverage. The values of DX and DY may be the same or different and may each range from about 500 m to about 1200 m or more.

Methods of invention include those where a single streamer tow vessel travels along a sincurve, clockwise and counterclockwise. This could be an advantage in an area with localized strong marine currents.

Figure 16A:
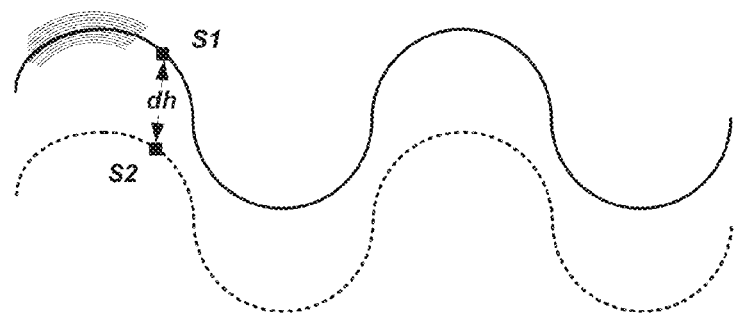
FIG. 16A-FIG. 16B illustrate other possible configurations if another source vessel is added to the streamer vessel for a sincurve acquisition.

FIG. 16A is a plan or overhead schematic view of another embodiment of the invention. In this method, a source-only vessel S2 towing a source following a sincurve is used in conjunction with a source-streamer vessel S1 towing a source 6 and streamers 4 following its own sincurve. The source vessel S2 travels parallel to the streamer vessel following the same sincurve advancing path. One possible position of source vessel 12 is illustrated in FIG. 13 at a distance dh. The distance dh is determined by design.

Figure 16B:
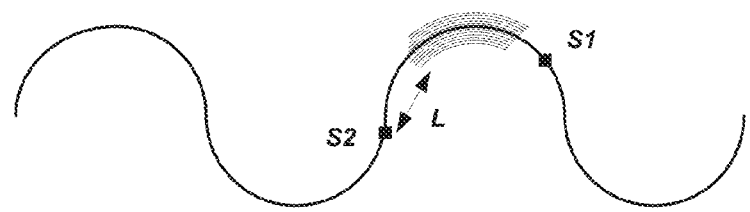

FIG. 16B illustrates another embodiment, comprising a second source S2 traveling on the same sincurve as the source S1 associated with the streamer vessel. The source S2 is positioned behind streamers 4 at a certain interval or distance L, which is not critical but may range from about 0.5 L to 2.0 L or more where L is the streamer length and is determined by design.

Figure 17:
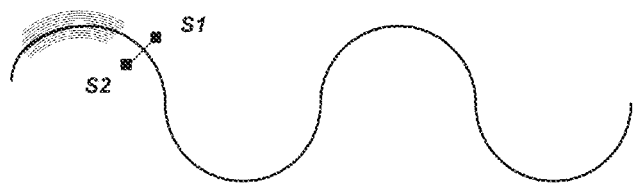
FIG. 17 illustrates that the source on the streamer vessel could be equipped with a dual source array, s1 and s2; however the typical source configuration for sincurve shooting geometry is a single source array.

Another possible embodiment consists in using a dual source array S1 and S2 on the streamer vessels and this is illustrated in FIG. 17. However, the typical source configuration for sincurve acquisition is to use a single source array.

Figure 18:
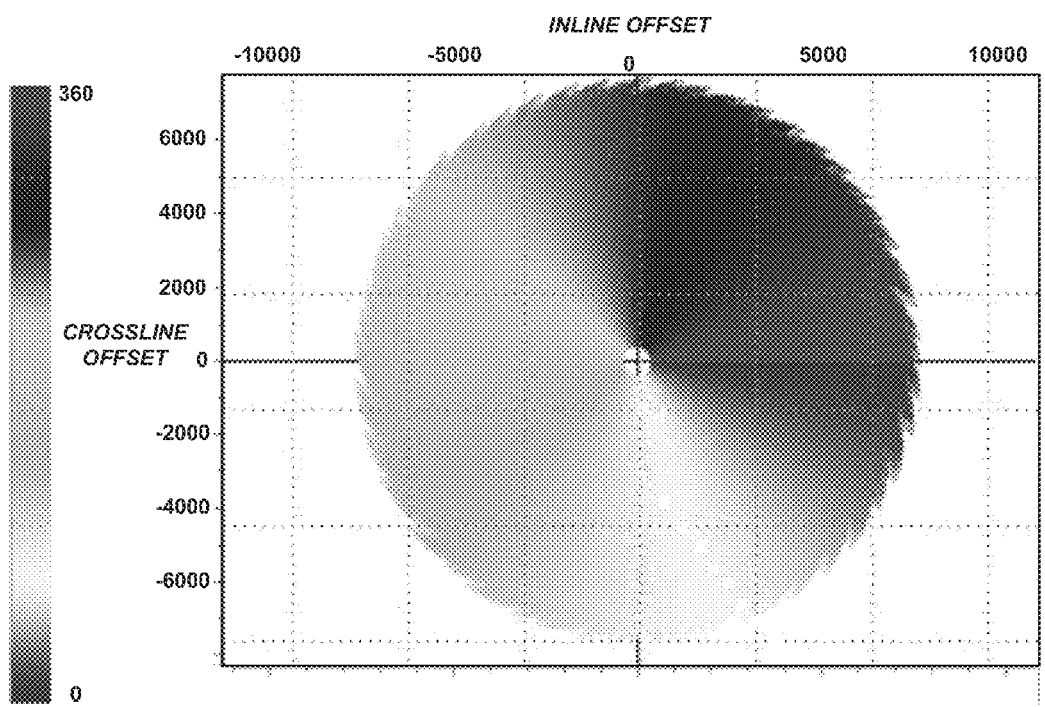
FIG. 18-FIG. 19 illustrate certain advantages of the present invention.
Figure 19:
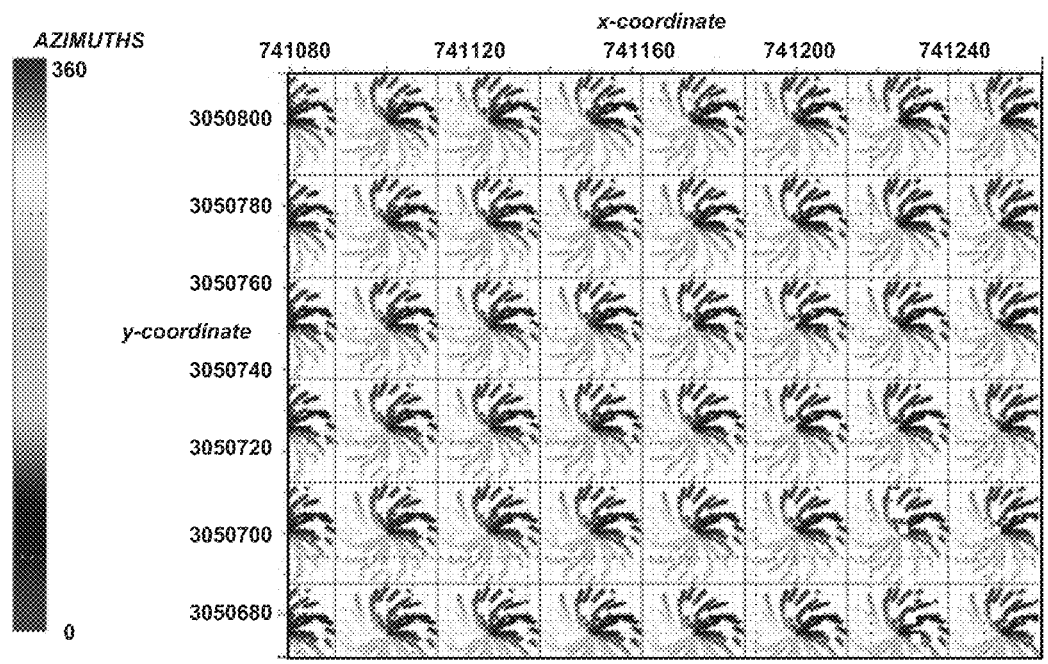
Figure 20:
FIG. 20 illustrates the ratio between the real offset versus the nominal offset measured from the source to the receiver.

Two of the above-listed possible advantages of methods of the invention for acquiring full and/or wide-azimuth towed streamer surveys are illustrated in FIG. 18 and FIG. 19. FIG. 18 is a computer rendition illustrating offset and azimuth distribution for a subsurface area of 500 m×500 m in accordance with one method of the invention. The azimuth-offset distribution is represented by the vector offset component diagram. It can be noticed that for all azimuths the offset distribution is similar: the inline offsets (horizontal axis) and the crossline offsets (vertical axis) have the same range; the gray colors represent the azimuths. FIG. 19 is a print of a computer display screen illustrating fold, offset and azimuth distribution for a series of bins generated from a sincurve acquisition geometry; it can be noticed that the azimuths from 0° to 360° (full azimuth distribution) are recorded with the same offset range.

Figure 21:
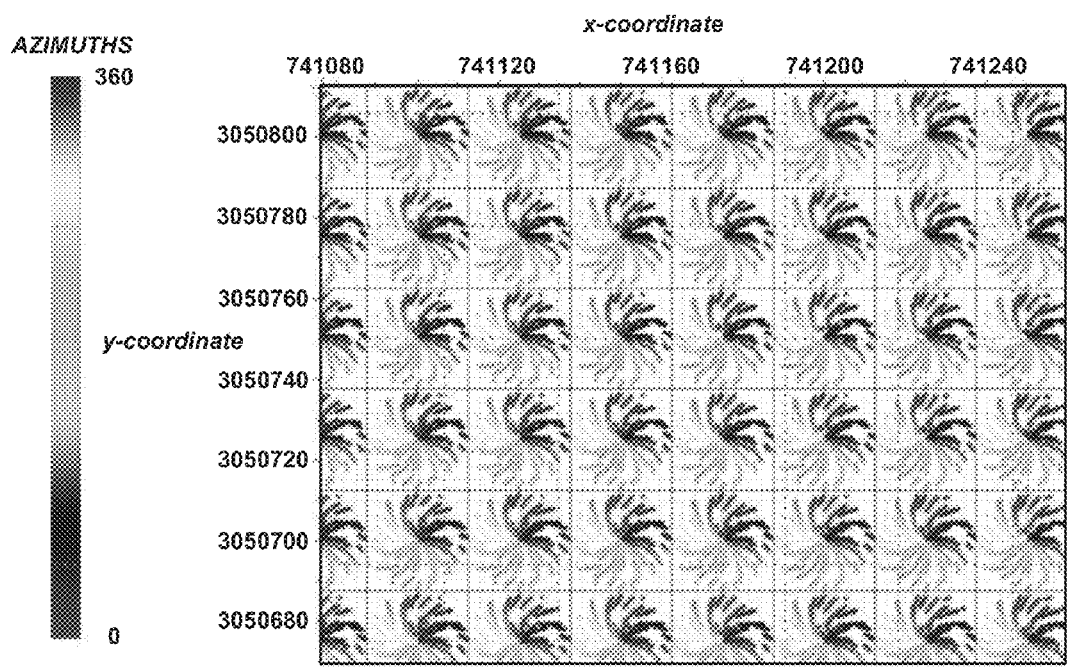
FIG. 21 graphs the offset-azimuth distribution for a series of bins generated from a sincurve acquisition geometry.
Figure 22:
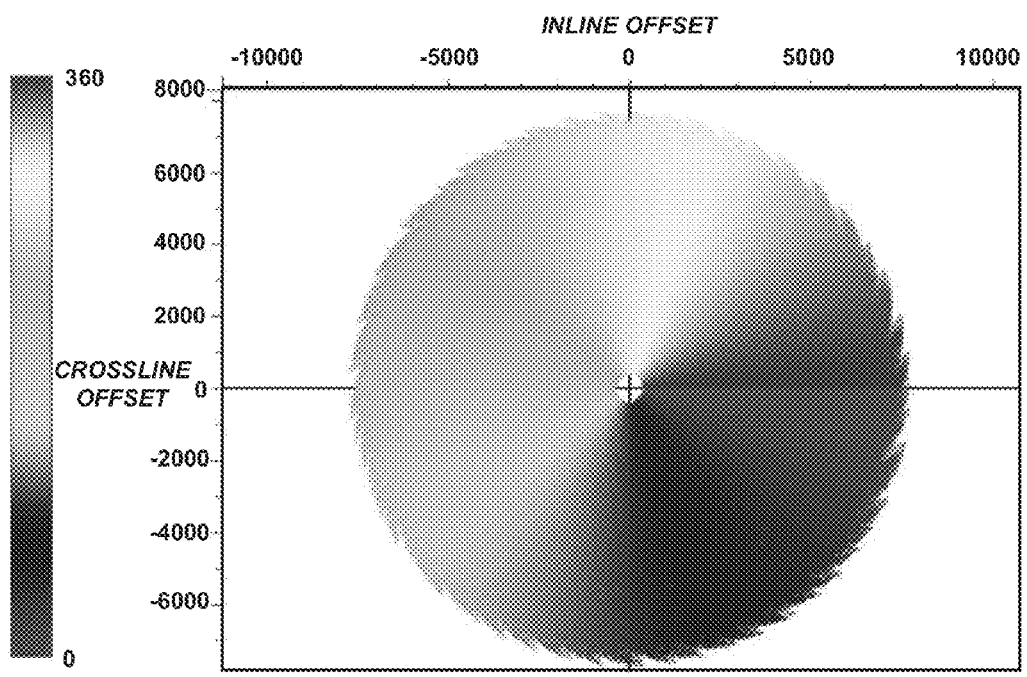
FIG. 22 is a vector offset component diagram for a sincurve acquisition.

As illustrated in the computer rendition of FIG. 18, full azimuth and offset distribution is collected, and very high fold is acquired, as is apparent in FIG. 19, a copy of a computer screen display using a method of the present invention. FIG. 21 graphs the offset-azimuth distribution for a series of bins generated from a sincurve acquisition geometry. FIG. 22 is a vector offset component diagram for a sincurve acquisition.

Figure 23:
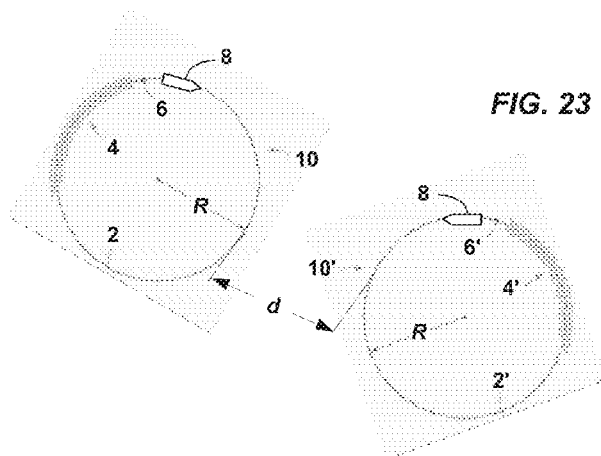
FIG. 23 is a plan, overhead schematic views of another embodiment of the invention employing a circular shoot; and FIG. 24A

FIG. 23 illustrates an efficient method to acquire wide-azimuth surveys using coil shooting and simultaneous sources. Vessel 8 and vessel 8' shoot a circular geometry over the same prospect (not shown). The vessels 8, 8' are separated by an optimum distance d that could be, for example, 20 to 30 km. Vessel 8 shoots always every N seconds and vessel 8' shoots at N+/−dt. It is noted that the value of dt can be determined based on the processing requirements. Different mathematical algorithms could be used to optimally derive the shooting sequence. The total acquisition time can be reduced by 50% relative to conventional marine surveys.

Figure 24A:
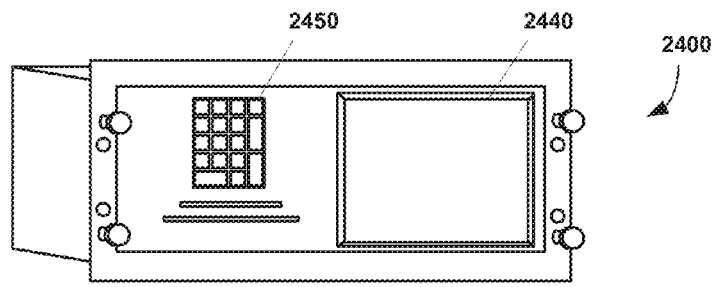
-FIG. 24B shows a rack mounted computer system such as may be used in some aspects of the present invention.
Figure 24B:
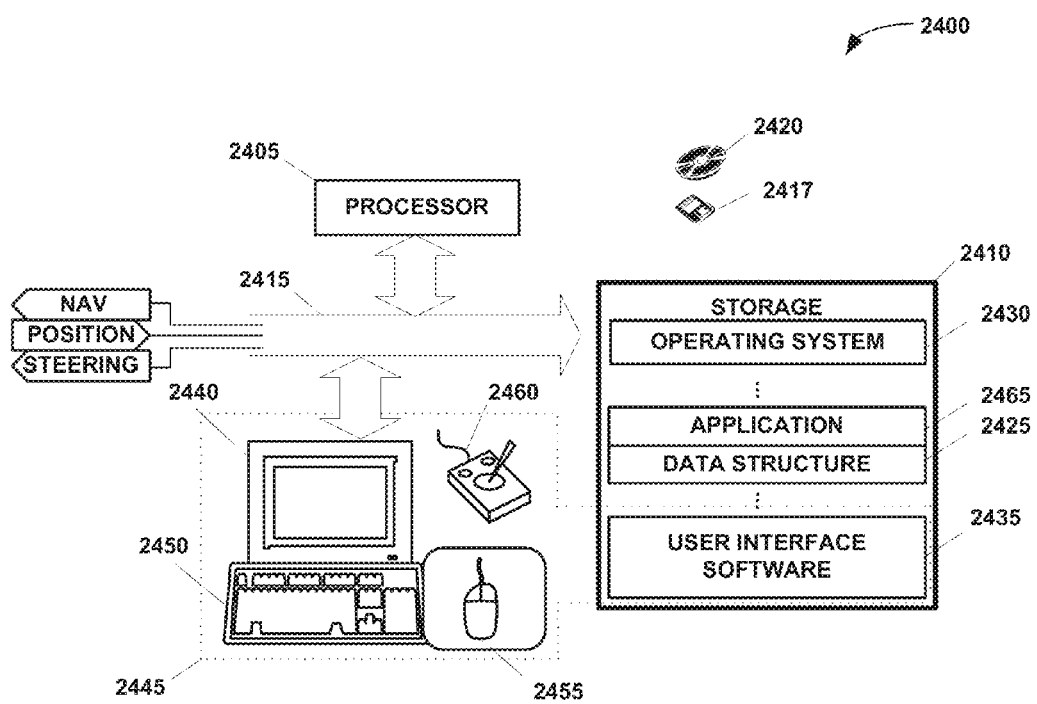

As noted above, and as will be appreciated by those in the art having the benefit of this disclosure, the survey vessels 8, 8' will be equipped with computer-implemented navigation and control systems. FIG. 24A-FIG. 24B depict a rack-mounted computing apparatus 2400 with which the navigation and control systems may be implemented. The computing apparatus 2400 includes a processor 2405 communicating with some storage 2410 over a bus system 2415. The storage 2410 may include a hard disk and/or random access memory ("RAM") and/or removable storage such as a floppy magnetic disk 2417 and an optical disk 2420. The storage 2410 is encoded with a data structure 2425 storing the data set acquired as discussed above, an operating system 2430, user interface software 2435 and an application 2465.

The user interface software 2435, in conjunction with a display 2440, implements a user interface 2445. The user interface 2445 may include peripheral I/O devices such as a key pad or keyboard 2450, a mouse 2455, or a joystick 2460.

The processor 2405 runs under the control of the operating system 2430, which may be practically any operating system known to the art. The application 2465 is invoked by the operating system 2430 upon power up, reset, or both, depending on the implementation of the operating system 2430. The application 2465 issues navigation commands ("NAV") to the vessel 8, 8' in accordance with its program to sail the vessel 8, 8' on the generally advancing curved path 2 and to tow the marine seismic streamers 4 and/or source 6, depending on the particular embodiment. The application 2465 also, in this particular embodiment, receives positioning data ("POSITION") from the marine seismic streamers 4 and issues steering commands ("STEERING") to the steering devices thereon.

Note that the nature of the software control in terms of architecture or situs is immaterial to the practice of the invention. For example, in some embodiments, the navigation and streamer steering may be performed by separate software components that may be, for instance, utilities or daemons. Similarly, this functionality may be distributed across separate computing apparatuses in some embodiments, as well.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying" and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber or some other suitable transmission medium known to the art. The invention is not limited by these aspects of any given implementation.

As noted above, various methods of acquiring azimuth rich seismic data in the marine environment exist within the seismic industry; these methods usually require multiple seismic vessels. One method of acquiring azimuth rich seismic data using a single vessel utilizes the concept of sailing the seismic vessel along continuously curved sail lines. These continuously curved sail lines can take the form of a series circles, or a series of ellipses, or some other form of continuous curve, or approximations to a continuous curve. Approximations to a continuous curve could take the form of a hexagon, octagon or similar.

In order to achieve a predictable offset and azimuth distribution over the survey area, the centers or nodes of each continuously curved sail-line should precess over the survey area in a regular pattern. The seismic vessel then collects data by making one or more orbits around each node before moving to orbit the next node. The seismic vessel can move from one orbit to the next as a curved or straight-line extension of the continuous curve. The vessel may move from orbiting one node to the orbiting another node in any random or non-random order. The invention is a method distributing the centers or nodes of the continuously curved sail-lines in such a way as to efficiently collect azimuth-rich data, over the entire survey area.

Figure 25:
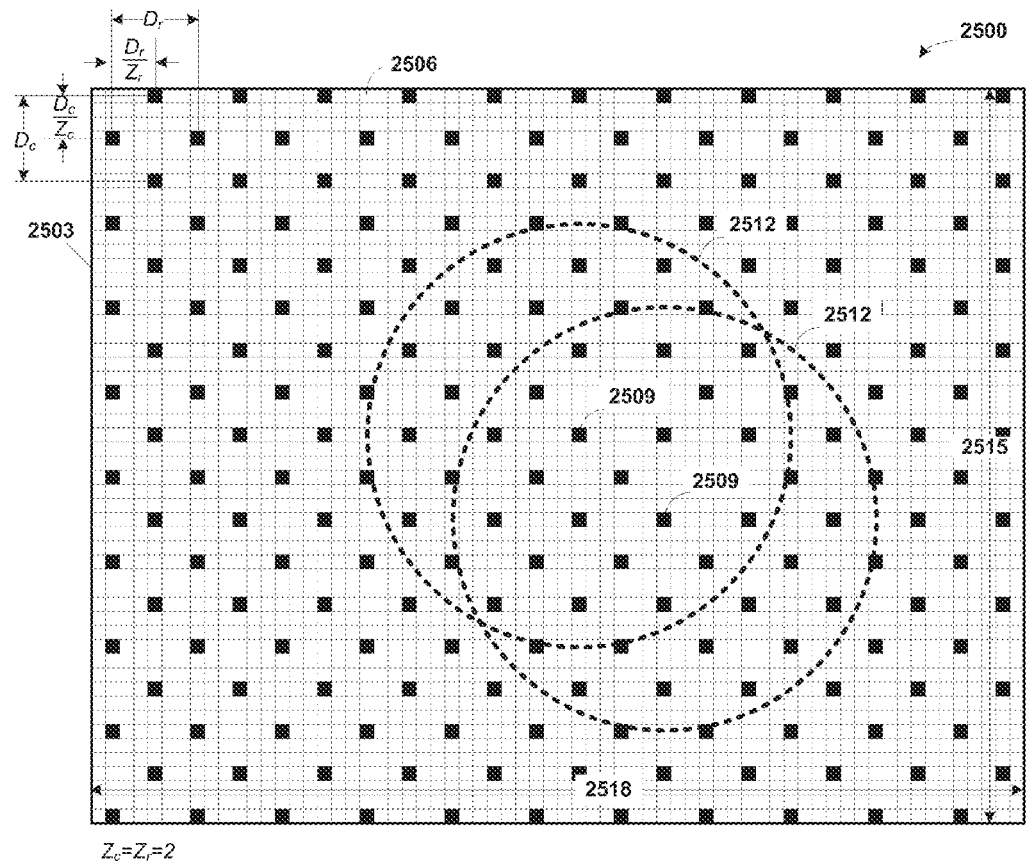

Referring now to FIG. 25, divide the survey area 2500 into a regular grid 2503 of tiles 2506 (only one indicated), the tile size being equal to the nominal sub-surface swath width of the acquisition configuration proposed. The nominal sub-surface swath width is determined by the number of cables $N_c$ and the cable separation $D_c$ used in the particular acquisition configuration being used. The subsurface swath ("SSSW") width is given by:

$$SSSW = 0.5 * N_c * D_c \quad (5)$$

Position the centers or nodes 2509 of each continuously curved sail-lines 2512 within the tiles 2506 which are spaced at a regular increment "$D_c$" along each column 2515 (only one indicated) of tiles 2506 and a regular increment "$D_r$" along each row 2518 (only one indicated) of tiles 2506, this forms a set or group of nodes 2509. The increment $D_c$ may or may not be the same as the increment $D_r$. But $D_c$ and $D_r$ can be an even integer (2, 4, 6, 8, 10, 12, etc.) number of tiles 2506. (Condition 1)

Subsequent sets or groups of nodes 2509 are positioned within the tiles 2506, which are spaced at the same regular increments "$D_c$" and "$D_r$" along each column 2515 and row 2518 of tiles 2506. But offset from a previous set of nodes 2509 by one or more $D_c/Z_c$ increments along each column 2515 of tiles 2506 and one or more $D_r/Z_r$ increments along each row 2518 of tiles 2506. The quotients $D_c/Z_c$ and $D_r/Z_r$ are integers, see FIG. 25-FIG. 33. (Condition 2)

Figure 35:
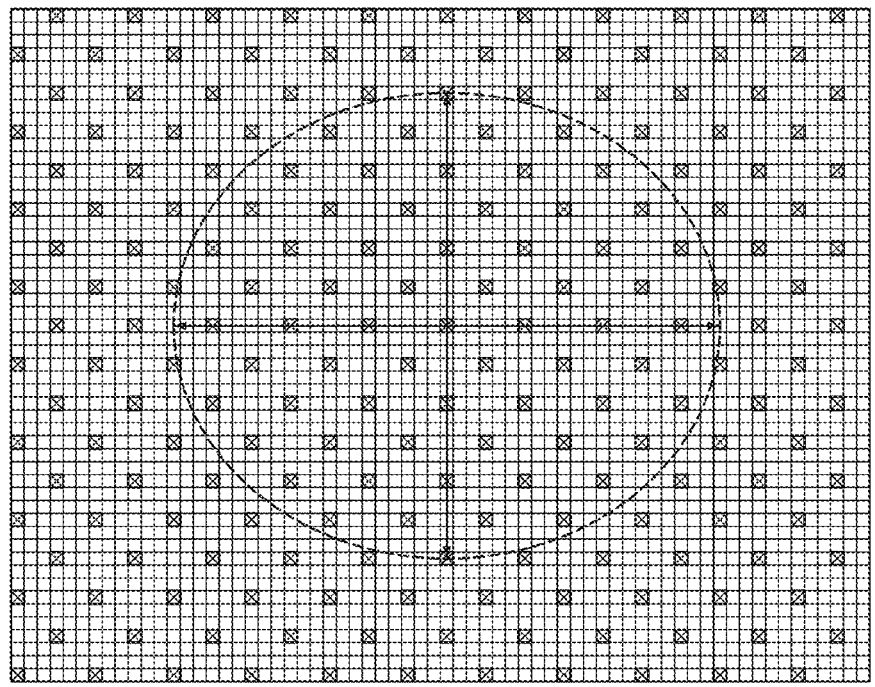

The diameter of curvature of the continuously curved sail-line (in the case of a continuously curved sail-line described by a circle, as shown in FIG. 25, or an octagon, as shown in FIG. 34), or radii (in the case of a continuously curved sail-line described by an ellipse, as shown in FIG. 35) is an integer multiple of $D_c$ and $D_r$. (Condition 3)

Figure 36:
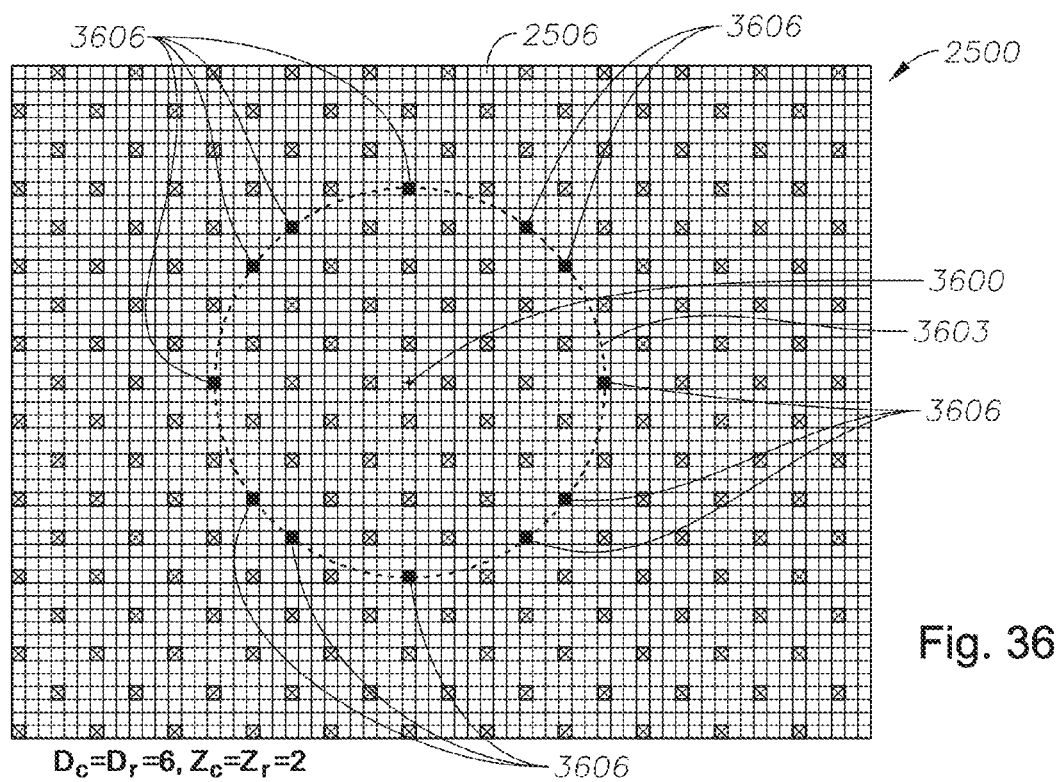
Figure 37:
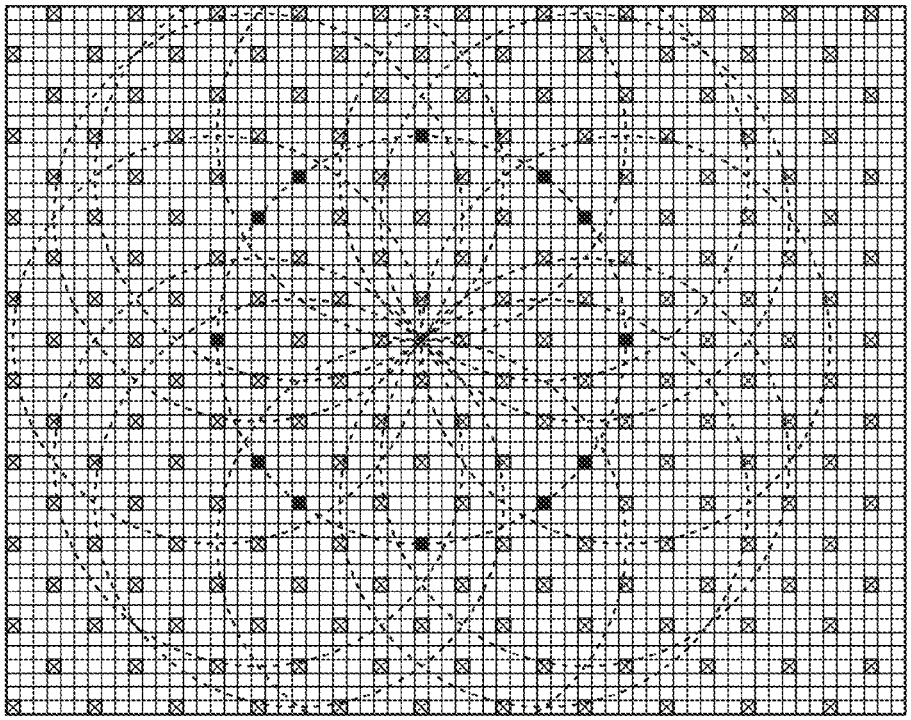

Consider a tile 3600, in FIG. 36, that does not contain a node of a continuously curved sail-line. Centered around this tile is a circle 3603 of diameter 5*$D_r$ (in this example). The circumference of this circle intersects 12 tiles 3606 that are nodes of continuously curved sail-lines. Therefore the continuously curved sail-lines that orbit these (dark) nodes will all contribute to the coverage within the tile 3600 in the center of the tile under consideration as shown in FIG. 37.

FIG. 25-FIG. 33 illustrate the pattern of nodes 2509 given by various combinations of $D_c$, $D_r$, $Z_c$ and $Z_r$. If $D_c=D_r$, and $Z_c=Z_r=2$, 4 or 6 for example the basic node pattern is a rhombus, see FIG. 26, FIG. 28, FIG. 29 and FIG. 30. This rhombic pattern repeats over the survey area 2500. For other combinations of $D_c$, $D_r$, $Z_c$ and $Z_r$, more complex basic node patterns are formed, which again, repeat over the survey area, see FIG. 27 and FIG. 32. For each combination of $D_c$, $D_r$, $Z_c$ and $Z_r$ a basic node pattern is formed. If we define (in this example) a unit area of 12*12 tiles, then each basic pattern delivers a differing number of nodes per unit area as given in the captions for FIG. 26-FIG. 32.

Figure 38:
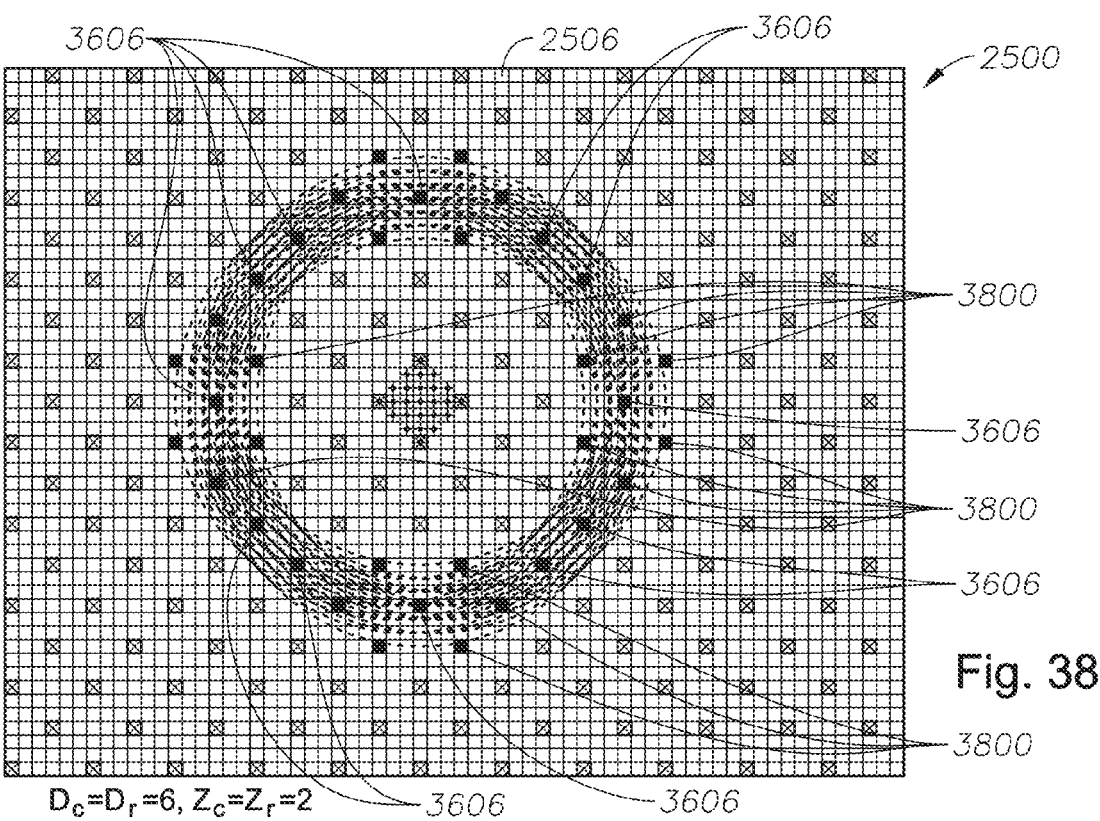

Now consider a base rhombic node pattern bounded by 4 (in this example) tiles that contain nodes of continuously curved sail-lines; FIG. 38. Center on each of these tiles within this basic pattern a circle of radius 5*$D_r$ (in this example). The circumferences of all of these circles intersect 36 tiles 3800 that are nodes of continuously curved sail-lines. Therefore the continuously curved sail-lines that orbit these 36 nodes 3800 all contribute to the coverage of the group of tiles 2506 bounded by the basic rhombic node pattern. The coverage achieved within this basic rhombic node pattern is repeated over the entire survey area 2500. For any basic node pattern the efficacy of the coverage achieved in satisfying the geophysical objectives of the survey can be confirmed by a separate modeling exercise of this basic unit.

The minimum turning circle of a seismic vessel is a function of the vessel design, and the type and geometry of the equipment it is towing. This minimum turning circle will dictate the minimum radius of turn for a continuously curved sail-line. For the purpose of illustration assume that the vessel is towing 8 cables at 100 m cable separation and the minimum turn radius in 5,750 m. Given this configuration the tile size is 400 m (Equation 5), so this minimum turn diameter is 28.75 tiles. This value does not satisfy conditions 1, 2 and 3 as outlined above.

Minimum turn diameter in tiles=(2*5,750)/400=28.75

In order to satisfy conditions 1, 2 and 3 the minimum diameter for a continuously curved sail-line for this acquisition configuration is 30 tiles (this being first the integer value greater than 28.75 that satisfies all 3 conditions). Given a continuously curved sail-line diameter of 30 tiles, in order to satisfy condition 3 $D_c$ and $D_r$ can have the values of 5 or 6 tiles. Given these values for $D_c$ and $D_r$, in order to satisfy condition 2, $Z_c$ and $Z_r$ can have values of 2 or 3 only if $D_c/D_r$ equals 6. $D_c=D_r=6$ and $Z_c=Z_r=2$ is illustrated in FIG. 25.

Alternatively a continuously curved sail-line diameter of 32 tiles would also satisfy all 3 conditions for this illustrative acquisition geometry. Given a continuously curved sail-line diameter of 32 tiles, in order to satisfy condition 3 $D_c$ and $D_r$ can have the values of 2, 4, 8, or 16 tiles. Given these values for $D_c$ and $D_r$, in order to satisfy condition 2, $Z_c$ and $Z_r$ can have values of 1, 2, 2 and 4 for $D_c/D_r=8$, and 2, 4 and 8 for $D_c/D_r=16$ Alternatively a continuously curved sail-line diameter of 36 tiles would also satisfy all 3 conditions for this illustrative acquisition geometry. Given a continuously curved sail-line diameter of 36 tiles, in order to satisfy condition 3 $D_c$ and $D_r$ can have the values of 6 or 12 tiles. Given these values for $D_c$ and $D_r$, in order to satisfy condition 2, $Z_c$ and $Z_r$ can have values of 2 and 3 if $D_c/D_r=6$, and 2, 3, 4 and 6 if $D_c/D_r=12$. $D_c=D_r=12$ and $Z_c=Z_r=2$, 3, 4 and 6 are illustrated in FIG. 26, FIG. 27, FIG. 28 and FIG. 29.

The total sail line distance that the seismic vessel has to traverse, in order to acquire "Azimuth Rich Seismic Data in the Marine Environment Using a Regular Sparse Pattern of continuously curved Sail-lines" is:

The product of, the number of nodes each continuously curved sail-line has to orbit and the circumference of the orbit of each continuously curved sail-line.

Plus the distance traveled moving from one orbit to the next.

As is illustrated in FIG. 26-FIG. 32, each set of values for $D_c$, $D_r$, $Z_c$ and $Z_r$ deliver a differing number of nodes per unit area. So provided the coverage achieved within the basic node patterns for the sets of values of $D_c$, $D_r$, $Z_c$ and $Z_r$ that are applicable for a particular acquisition geometry satisfy the geophysical objectives of the seismic survey; which under normal circumstances would be confirmed by a separate modeling exercise.

It becomes relatively simple (to someone practiced in the art of seismic survey design) to determine which combination of $D_c$, $D_r$, $Z_c$, $Z_r$ and continuously curved sail-line diameter will distribute the centers or nodes of the continuously curved sail-lines in such a way as to efficiently collect azimuth-rich data, over the entire survey area.

Thus, with respect to FIG. 25-FIG. 38:

FIG. 25 Basic pattern components (D=6 and $Z_c=Z_r=2$ in this example)

Figure 26:
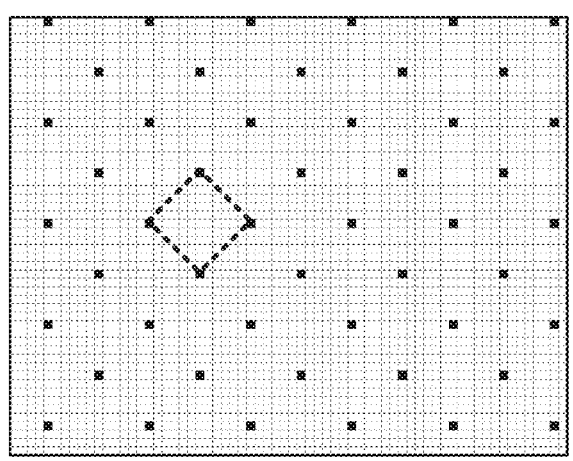

FIG. 26 Acquisition pattern for D=12 and $Z_c=Z_r=2$ illustrating the repeating rhombic patterns of the nodes-dark line. Define a unit area as 12 tiles by 12 tiles for this combination of $D_c$, $D_r$, $Z_c$ and $Z_r$ there are two nodes per unit area.

FIG. 27 Acquisition pattern for D=12 and $Z_c=Z_r=3$, illustrating the repeating patterns of the nodes-dark line. Define a unit area as 12 tiles by 12 tiles for this combination of $D_c$, $D_r$, $Z_c$ and $Z_r$ there are five nodes per unit area.

FIG. 28 Acquisition pattern for D=12 and $Z_c=Z_r=4$ illustrating the repeating rhombic pattern of nodes. Define a unit area as 12 tiles by 12 tiles for this combination of $D_c$, $D_r$, $Z_c$ and $Z_r$ there are six nodes per unit area.

Figure 29:
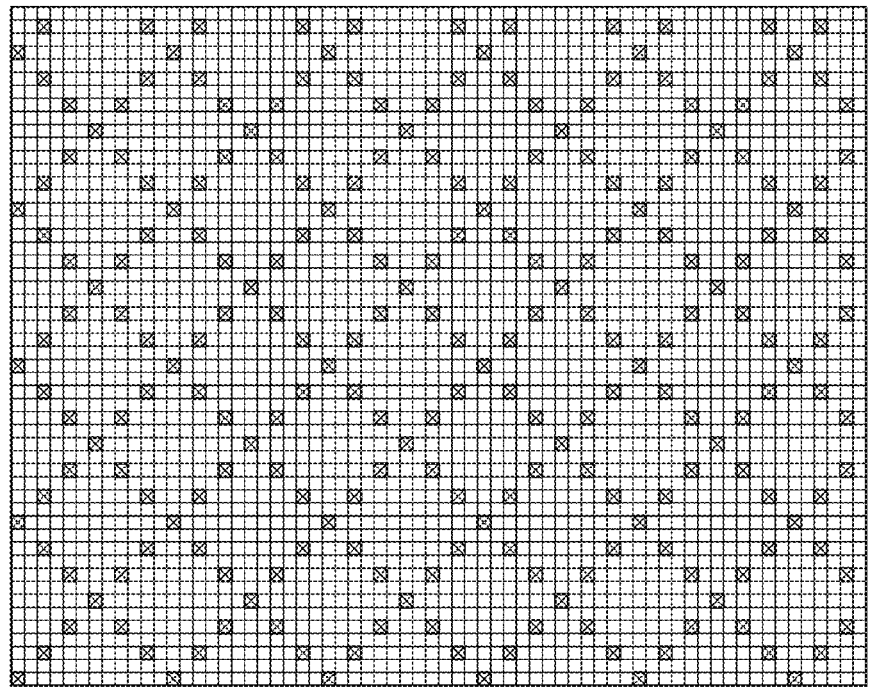

FIG. 29 Acquisition pattern for D=12 and $Z_c=Z_r=6$ illustrating the repeating rhombic pattern of nodes. Define a unit area as 12 tiles by 12 tiles for this combination of $D_c$, $D_r$, $Z_c$ and $Z_r$ there are ten nodes per unit area.

Figure 30:
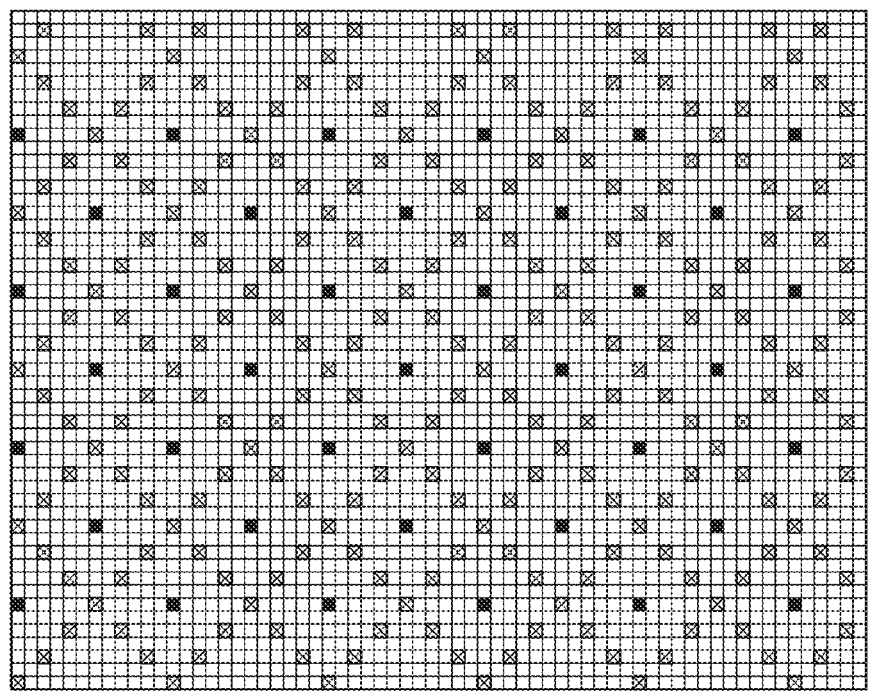

FIG. 30 Acquisition pattern for D=12 and $Z_c=Z_r=6$ and 2 illustrating the repeating rhombic pattern of nodes. Define a unit area as 12 tiles by 12 tiles for this combination of $D_c$, $D_r$, $Z_c$ and $Z_r$ there are 12 nodes per unit area.

FIG. 31 Acquisition pattern for D=4 and $Z_c=Z_r=1$ illustrating the repeating square pattern of nodes. Define a unit area as 12 tiles by 12 tiles for this combination of $D_c$, $D_r$, $Z_c$ and $Z_r$ there are nine nodes per unit area.

FIG. 32 Acquisition pattern for $D_c=8$, $D_r=12$, and $Z_c=Z_r=2$ illustrating the repeating more complex pattern of nodes. Define a unit area as 12 tiles by 12 tiles for this combination of $D_c$, $D_r$, $Z_c$ and $Z_r$ there are four nodes per unit area.

FIG. 33 Acquisition pattern for $D_c=8$, $D_r=12$, and $Z_c=Z_r=2$ with the Continuously Curves sail-lines taking the form of an ellipse FIG. 34 Acquisition pattern for $D_c=6$, $D_r=6$, and $Z_c=Z_r=2$ with continuously curved sail-lines described by a circle of diameter $5*D_r$, $6*D_r$ and $7*D_r$. And a continuously curved sail-line described by an octagon of diameter $6*D_r$.

FIG. 35 Acquisition pattern for $D_c=6$, $D_r=6$, and $Z_c=Z_r=2$ with continuously curved sail-lines described by an ellipse of diameter $6*D_c$, and $7*D_r$.

FIG. 36 Acquisition pattern for $D_c=6$, $D_r=6$, and $Z_c=Z_r=2$ with a circle of diameter $5*D_r$ centered on a tile that does not contain a node of a continuously curved sail-line. The circumference of this circle intersects 12 (dark) tiles that are nodes of a continuously curved sail-line. Therefore the continuously curved sail-lines that orbit these (dark) nodes all contribute to the coverage within the tile highlighted by the cross in the center. See FIG. 37.

FIG. 37 Acquisition pattern for $D_c=6$, $D_r=6$, and $Z_c=Z_r=2$ with a circle of diameter $5*D_r$ centered on a tile that does not contain a node of a continuously curved sail-line. The continuously curved sail-lines that orbit these (dark) nodes all contribute to the coverage within the tile highlighted by the cross in the center.

FIG. 38 Acquisition pattern for $D_c=6$, $D_r=6$, and $Z_c=Z_r=2$ Consider a group of tiles bounded by 4 tiles which contain nodes. Center on each of these tiles a circle of diameter $5*D_r$ (in this example). The circumferences of all of these circles intersect 36 (dark) tiles that are nodes of continuously curved sail-lines. Therefore the continuously curved sail-lines that orbit these 36 (dark) nodes all contribute to the coverage of the group of tiles bounded by the 4 nodes.

Figure 39:
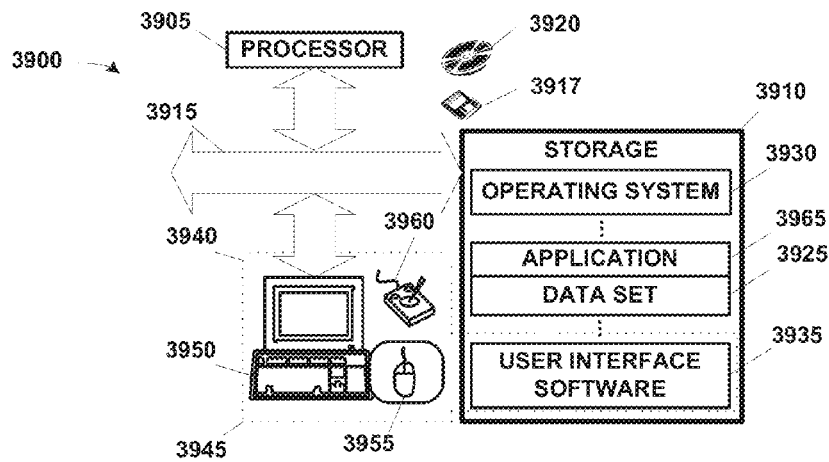
FIG. 39 shows selected portions of the hardware and software architecture of a computing apparatus such as may be employed in some aspects of the present invention.
Figure 40:
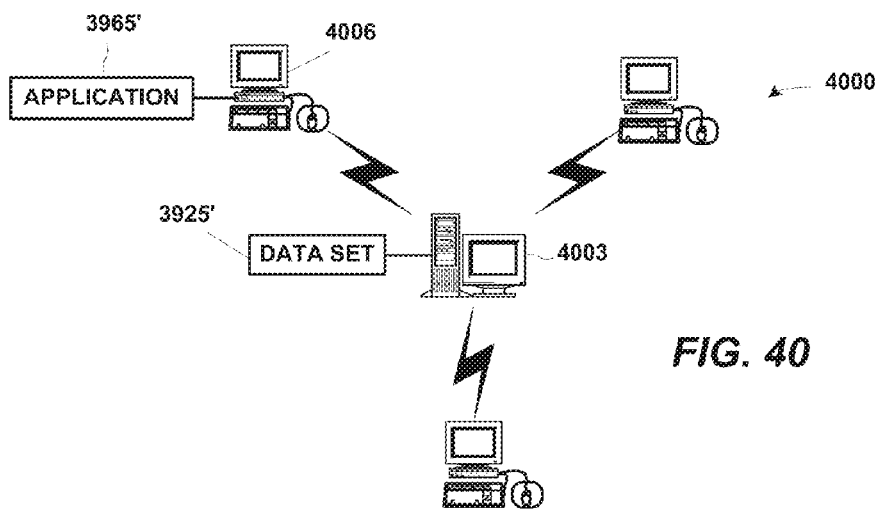
FIG. 40 illustrates a computing system on which some aspects of the present invention may be practiced in some embodiments.

In one aspect, the present invention is a software-implemented method. The location at which the method is practiced is not material. The method for determining the sail lines disclosed herein may be practiced at sea on board a survey vessel or on land at a central processing facility. FIG. 39 shows selected portions of the hardware and software architecture of a computing apparatus 3900 such as may be employed in some aspects of the present invention. The computing apparatus 3900 includes a processor 3905 communicating with storage 3910 over a bus system 3915. The storage 3910 may include a hard disk and/or random access memory ("RAM") and/or removable storage such as a floppy magnetic disk 3917 and an optical disk 3920.

The storage 3910 is encoded with a data set 3925. The storage 3910 is also encoded with an operating system 3930, user interface software 3935 and an application 3965. The user interface software 3935, in conjunction with a display 3940, implements a user interface 3945. The user interface 3945 may include peripheral I/O devices such as a keypad or keyboard 3950, a mouse 3955, or a joystick 3960. The processor 3905 runs under the control of the operating system 3930, which may be practically any operating system known to the art. The application 3965 is invoked by the operating system 3930 upon power up, reset, or both, depending on the implementation of the operating system 3930. The application 3965, when invoked, performs the method of the present invention. The user may invoke the application in conventional fashion through the user interface 3945.

Note that there is no need for the data set 3925 to reside on the same computing apparatus 3900 as the application 3965 by which it is processed. Some embodiments of the present invention may therefore be implemented on a computing system, e.g., the computing system 4000 in FIG. 39, comprising more than one computing apparatus. For example, the data set 3925 may reside in a data structure residing on a server 4003 and the application 3965' by which it is processed on a workstation 4006 where the computing system 4000 employs a networked client/server architecture.

However, there is no requirement that the computing system 4000 be networked. Alternative embodiments may employ, for instance, a peer-to-peer architecture or some hybrid of a peer-to-peer and client/server architecture. The size and geographic scope of the computing system 4000 is not material to the practice of the invention. The size and scope may range anywhere from just a few machines of a Local Area Network ("LAN") located in the same room to many hundreds or thousands of machines globally distributed in an enterprise computing system.

Figure 41:
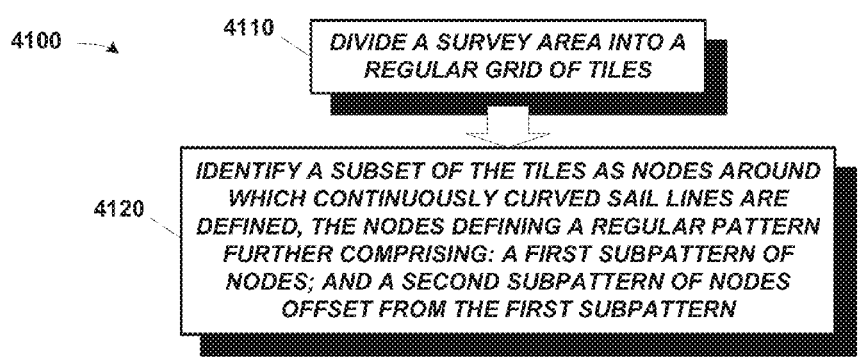
FIG. 41 illustrates a method for determining a sail plan for a towed-array marine seismic survey in accordance with another aspect of the present invention.

Thus, in accordance with this aspect of the present invention, the application 3965, shown in FIG. 39, performs a method 4100, shown in FIG. 41, for determining a sail plan for a towed-array marine seismic survey, such as that shown in FIG. 1. The method 4100 begins with dividing (at 4110) a survey area into a regular grid of tiles as described above. A subset of the tiles are then identified (at 4120) as nodes around which continuously curved sail lines are defined. The nodes define a regular pattern further comprising: a first subpattern of nodes; and a second subpattern of nodes offset from the first subpattern.

The following documents are incorporated by reference herein for all purposes as if set forth herein verbatim:

U.S. application Ser. No. 11/114,773, filed Apr. 26, 2005, entitled, "Seismic Streamer System and Method" and filed in the name of the inventors Singh et al., published Oct. 26, 2006, as Patent Publication 2006/0239117 A1;

U.S. application Ser. No. 11/122,646, filed Mar. 5, 2005, entitled, "Forward looking systems and methods for positioning marine seismic equipment" and filed in the name of the inventors Toennessen et al., published Nov. 16, 2006, as Patent Publication 2006/0256653 A1;

U.S. Pat. No. 5,668,775, entitled "Methods for determining the position of seismic equipment, and applications of the methods" and issued Sep. 16, 1997, to GECO A. S. in the name of the inventor Kjell Hatteland;

U.S. Pat. No. 6,671,223, entitled, "Control devices for controlling the position of a marine seismic streamer" and issued Dec. 30, 2003, to WesternGeco, L.L.C. in the name of the inventor Simon H. Bittleston; U.S. patent application Ser. No. 12/121,324, entitled "Methods for Efficiently Acquiring Wide-Azimuth Towed Streamer Seismic Data," filed May 15, 2008, and filed in the name of the inventors Moldoveanu et al.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for designing a survey, comprising:
   dividing a survey area into a grid of tiles;
   positioning a first set of nodes around which continuously curved sail lines are defined within a first subset of the tiles; and
   positioning a second set of nodes around which continuously curved sail lines are defined within a second subset of the tiles such that respective nodes in the second set of nodes are offset from respective nodes in the first set of nodes by a first increment in a first direction, wherein the respective nodes in the second set of nodes are further offset from the respective nodes in the first set of nodes by a second increment in a second direction.

2. The method of claim 1, wherein each tile has a subsurface swath width based at least in part on a number of streamer cables in an array and a separation distance between the streamer cables.

3. The method of claim 2, wherein each tile is equal to $0.5*N_c*$cable separation, where $N_c$ is the number of streamer cables in the array.

4. The method of claim 1, wherein the first direction is a column direction.

5. The method of claim 1, wherein the first direction is a row direction.

6. The method of claim 1, wherein the first increment is $D_c/Z_c$.

7. The method of claim 6, wherein $D_c/Z_c$ is an integer.

8. The method of claim 1, wherein the second increment is $D_r/Z_r$.

9. The method of claim 8, wherein $D_r/Z_r$ is an integer.

10. The method of claim 1, wherein the survey is configured to acquire full azimuth seismic data of the survey area.

11. The method of claim 1, wherein the continuously curved sail lines comprise one or more shapes that approximate one or more circles, one or more ovals, one or more sinusoidal curves, one or more figure eights, one or more ellipses, one or more octagons, or one or more hexagons.

12. A computer system, comprising:
a processor; and
a memory comprising program instructions executable by the processor to:
divide a survey area into a grid of tiles;
position a first set of nodes around which continuously curved sail lines are defined within a first subset of the tiles; and
position a second set of nodes around which continuously curved sail lines are defined within a second subset of the tiles such that respective nodes in the second set of nodes are offset from respective nodes in the first set of nodes by a first increment in a first direction, wherein the respective nodes in the second set of nodes are further offset from the respective nodes in the first set of nodes by a second increment in a second direction.

13. The computer system of claim 12, wherein each tile has a subsurface swath width based at least in part on a number of streamer cables in an array and a separation distance between the streamer cables.

14. The computer system of claim 12, wherein the continuously curved sail lines comprise one or more shapes that approximate one or more circles, one or more ovals, one or more sinusoidal curves, one or more figure eights, one or more ellipses, one or more octagons, or one or more hexagons.

15. A method for designing a survey, comprising:
dividing a survey area into a grid of tiles;
positioning a first set of nodes around which continuously curved sail lines are defined within a first subset of the tiles; and
positioning a second set of nodes around which continuously curved sail lines are defined within a second subset of the tiles such that respective nodes in the second set of nodes are offset from respective nodes in the first set of nodes by a first increment in a first direction, wherein the continuously curved sail lines defined within the first subset or the second subset of tiles comprise approximations of continuous curves, wherein the respective nodes in the second set of nodes are further offset from the respective nodes in the first set of nodes by a second increment in a second direction.

16. The method of claim 15, wherein each tile has a subsurface swath width based at least in part on a number of streamer cables in an array and a separation distance between the streamer cables.

17. The method of claim 15, wherein the continuous curves comprise one or more circles, one or more ovals, one or more sinusoidal curves, one or more figure eights, one or more ellipses, one or more octagons, or one or more hexagons.

* * * * *